(12) United States Patent
Ong et al.

(10) Patent No.: US 12,315,303 B2
(45) Date of Patent: May 27, 2025

(54) METHOD AND SERVER APPARATUS FOR ADAPTIVELY UPDATING A TARGET SUBJECT IDENTIFICATION STORED IN A DATABASE

(71) Applicant: NEC Corporation, Tokyo (JP)

(72) Inventors: Hui Lam Ong, Singapore (SG); Wei Jian Peh, Singapore (SG); Hong Yen Ong, Singapore (SG); Satoshi Yamazaki, Singapore (SG)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/274,397

(22) PCT Filed: Feb. 24, 2022

(86) PCT No.: PCT/JP2022/007736
§ 371 (c)(1),
(2) Date: Jul. 26, 2023

(87) PCT Pub. No.: WO2022/209475
PCT Pub. Date: Oct. 6, 2022

(65) Prior Publication Data
US 2024/0104966 A1    Mar. 28, 2024

(30) Foreign Application Priority Data
Mar. 29, 2021  (SG) .......................... 10202103210R

(51) Int. Cl.
*G06F 16/00* (2019.01)
*G06V 10/74* (2022.01)
(Continued)

(52) U.S. Cl.
CPC ............ *G06V 40/50* (2022.01); *G06V 10/761* (2022.01); *G06V 10/95* (2022.01); *G06V 40/172* (2022.01); *H04L 67/1097* (2013.01)

(58) Field of Classification Search
None
See application file for complete search history.

(56) References Cited

U.S. PATENT DOCUMENTS

| | | | |
|---|---|---|---|
| 2005/0091290 A1* | 4/2005 | Cameron | G06F 16/27 |
| 2009/0196179 A1* | 8/2009 | Clark | H04L 12/281 |
| | | | 370/235 |
| 2023/0206612 A1* | 6/2023 | Manepalli | G06V 10/62 |
| | | | 382/159 |

FOREIGN PATENT DOCUMENTS

| | | |
|---|---|---|
| JP | 2003-216654 A | 7/2003 |
| JP | 2007-509421 A | 4/2007 |

(Continued)

OTHER PUBLICATIONS

International Search Report for PCT Application No. PCT/JP2022/007736, mailed on May 17, 2022.

(Continued)

*Primary Examiner* — Anhtai V Tran

(57) ABSTRACT

Present disclosure provides a method and a server for adaptively updating a target subject identification to be stored in a database, the target subject identification pertaining to a target subject in a system comprising a plurality of servers, the server configured to: receive target subject information; assign a first target subject identification to the target subject information and store the first target subject identification in a first database of the server; and send a request, to the plurality of servers, to synchronize the target subject identification, the request including the target subject information relating to the target subject.

8 Claims, 21 Drawing Sheets

(51) Int. Cl.
    *G06V 10/94*     (2022.01)
    *G06V 40/16*     (2022.01)
    *G06V 40/50*     (2022.01)
    *H04L 67/1097*     (2022.01)

(56) References Cited

FOREIGN PATENT DOCUMENTS

| | | |
|---|---|---|
| JP | 2015-014929 A | 1/2015 |
| JP | 2019-164660 A | 9/2019 |
| JP | 2020-181469 A | 11/2020 |
| JP | 2021-033664 A | 3/2021 |

OTHER PUBLICATIONS

JP Office Action for JP Application No. 2023-558247, mailed on Aug. 20, 2024 with English Translation.

\* cited by examiner

METHOD AND SERVER APPARATUS FOR ADAPTIVELY UPDATING A TARGET SUBJECT IDENTIFICATION STORED IN A DATABASE

This application is a National Stage Entry of PCT/JP2022/007736 filed on Feb. 24, 2022, which claims priority from SG Patent Application 10202103210R filed on Mar. 29, 2021, the contents of all of which are incorporated herein by reference, in their entirety.

TECHNICAL FIELD

The present invention relates broadly, but not exclusively, to methods for adaptively updating a target subject identification relating to a target subject stored in a database in a server.

BACKGROUND ART

Face recognition technologies has been incorporated into many modern solutions such as online/physical retail transaction payment, building/door access control as well as customs clearance for better user experiences. In recent years, face recognition enabled video surveillance systems are getting more common due to availability of open source algorithms and affordable hardware. Face recognition technologies helps to reduce manpower in real-time security monitoring as well as speed up post incident investigation.

With capability to identify a target subject through detecting appearance from an image frame or a video footage and receiving target subject information, face recognition technologies are often help to reduce manpower in video surveillance system for public safety solution such as real-time security monitoring and post incident investigation.

Conventionally, a face recognition system is used mainly to identify a target subject as appearing in different venues or places based on respective target subject information received by one or more cameras within the system. The face recognition system may then store the target subject information in a database for further identification of the target subject by the system.

As the technology becomes more and more common, the deployment size is also growing at the same time. For example, a shopping mall can have a few hundreds of surveillance cameras implemented under one or more face recognition systems, while a densely populated city can easily have more than 100,000 surveillance cameras implemented under thousands different face recognition systems.

SUMMARY OF INVENTION

Technical Problem

While each face recognition system may have its own database for storing information relating to different identified subjects, a server may be used to manage the database and receive/provide such information in the database from/to other face recognition systems. The challenge to identify a same subject across multiple cameras and/or multiple different face recognition systems increases with increased number of deployment of cameras and systems.

Solution to Problem

In a first aspect, the present disclosure provides a server for adaptively updating a target subject identification stored in a database, the target subject identification pertaining to a target subject in a system comprising another server which is configured to send a request, the server configured to: receive the request comprising target subject information relating to the target subject, from the other server (E.g. Server A), to synchronize the target subject identification; and compare the received target subject information against information stored in the database to determine whether or not to accept the request to synchronize the target subject identification.

In a second aspect, the present disclosure provides a server for adaptively updating a target subject identification to be stored in a database, the target subject identification pertaining to a target subject in a system comprising a plurality of servers, the server configured to: receive target subject information; assign a first target subject identification to the target subject information and store the first target subject identification in a first database of the server; and send a request, to the plurality of servers, to synchronize the target subject identification, the request including the target subject information relating to the target subject.

In a third aspect, the present disclosure provides a method, by a server, of adaptively updating target subject identification stored in a database, the target subject identification pertaining to a target subject in a system comprising another server which is configured to send a request, the method comprising: receiving the request comprising target subject information relating to the target subject, from the other server, to synchronize the target subject identification; and comparing the received target subject information against information stored in the database to determine whether or not to accept the request to synchronize the target subject identification.

In a fourth aspect, the present disclosure provides a method, by a server, for adaptively updating a target subject identification to be stored in a database, the target subject identification pertaining to a target subject in a system comprising a plurality of servers, the method comprising: receiving target subject information; assigning a first target subject identification to the target subject information and store the first target subject identification in a first database of the server; and sending a request, to the plurality of servers, to synchronize the target subject identification, the request including the target subject information relating to the target subject.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

Embodiments of the invention will be better understood and readily apparent to one of ordinary skill in the art from the following written description, by way of example only, and in conjunction with the drawings.

DESCRIPTION OF EMBODIMENTS

Figure 1:
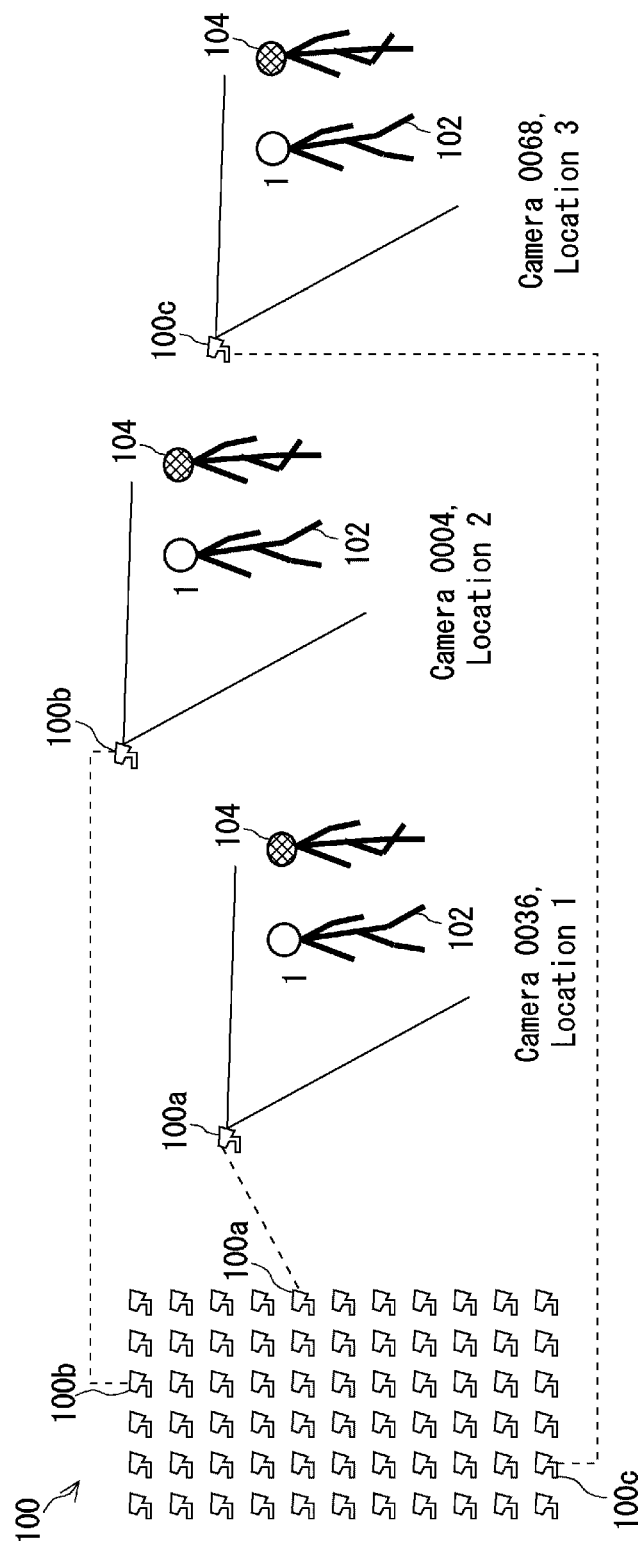
FIG. 1 depicts an example system used for identifying a target subject.

Benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Example embodiments according to the present disclosure will be described hereinafter with reference to the drawings. The same numeral signs are assigned to the same elements throughout the drawings, and redundant explanations are omitted as necessary. In addition, predetermined information (e.g., a predetermined value or a predetermined threshold) is stored in advance in a storage device to which a computer using that information has access unless otherwise described.

Term Description

Server—a server or client may host software application programs for receiving inputs from the camera(s), retrieving and processing information from the data inputs (e.g., camera), identifying subjects, transmitting information and adaptively updating subject identifications (IDs) stored in a database of the server. In various embodiments below, a server may be referred to a face recognition system used for receiving facial information, identifying subject(s) based on the facial information (appearances), assign the facial information to a subject ID, stored the facial information, manage its own subject ID registry, i.e. a list of subject IDs, stored in its database and transmit the facial information and subject IDs to other servers and receive similar facial information and related subject IDs from other servers. The server communicates with other servers (e.g., other face recognition systems) to update a subject ID pertaining to a subject stored in its database such that the subject ID synchronized and matched with that stored in databases of the other servers.

Database—a database is a component associated with a server and may be configured to store information (data, or sets of data) and maintain subject IDs registry, i.e., a list of subject IDs pertaining to a list of different subjects. Each set of data stored in the database of a server may be assigned to a subject ID so as to identify the set of data correspond to a specific subject. According to the present disclosure, a subject ID pertaining to a subject initially stored in a database may be updated adaptively to match with that stored in databases of other servers. It is appreciated by a skilled person that information stored in (or retrieve from) a database of a server can be interpreted as information stored in (or retrieve from) a server.

System—a system comprises one or more servers (face recognition systems) and one or more database, each server of the one or more servers receiving data inputs (e.g., camera) and maintaining its own subject IDs registry corresponding to the subject stored in the database. According to the present disclosure, each server (face recognition system) within the system may send a request to another server(s) to synchronize a subject ID and thus adaptively update the subject ID stored in its corresponding database based on responses regarding the subject ID received from the other server(s).

Target subject—a target subject may be any suitable type of entity, which may include a person, a user or a subject whose identification (ID) will be adaptively updated. In various embodiments, a target subject may refer to a new subject that does not match any subject in a list of subjects known to a server (based on a corresponding list of subject information and IDs stored in a database of the server) and hence a new subject ID (e.g., target subject ID) is created by the server for identifying the target subject. In one embodiment, if the target subject has been known to other servers (for example the other servers have stored in their respective databases information and ID identifying the target subject), the subject ID created for the target subject created by the server may be updated and synchronized with those of the other servers.

Target subject information—target subject information refers to information (data or sets of data) identifying a target subject. In various embodiments below, target subject information refers to facial information which includes relative position, size, shape and/or contour of eyes, nose, cheekbones, jaw and chin of a subject, iris pattern, skin colour and hair colour of a subject or combinations. Additionally or alternatively, target subject information may refer to characteristic information which includes physical characteristic information such as height, body size, apparel, belongings, other similar characteristic or combinations, or behavioral characteristic information such as body movement, position of limbs, direction of movement, the way of a subject walks, stands, moves and talks, other similar characteristic or combination. In various embodiments, target subject information is received through retrieval of information from an image frame captured by a camera or a sensor, or from a database or a memory of within a server or from another server. For sake of simplicity, facial information (appearance) is used for subject identification in various embodiments below.

Information stored in a database—information stored in a database may refer to an existing information (data or sets of data) relating to one or more subject that was previously received by a server. Each set of data stored in a database of a server may be assigned to a subject ID so as to identify the set of data corresponding to a specific subject. Such existing information will be retrieved to compare against information that is newly received by a server (e.g., from a camera or a database from another server) to identify if the newly received information exhibits a degree of similarity with existing information stored the database relating to one subject.

Target subject identification (ID)—a target subject ID is an ID assigned to information (data or sets of data) identifying a target subject (i.e., target subject information). In various embodiments, a system may comprise multiple servers, each of which may be configured to identify subjects based on information received by it and store its own list of subject IDs in its database. In this way, a same subject may correspond to different subject IDs stored in different servers of the system. In an embodiment, a synchronization of a target subject ID may be initiated by a first server in the system by sending to a second server in the system a request to synchronize a target subject ID pertaining to a target subject and information stored in a database of the first server relating to the target subject. The second server receiving the request and the information from the first server may compare the information received against information stored within its own database, and send a response whether or not to accept such request based on a result of the comparison.

In an embodiment, the second server may include its own target subject ID and target subject information stored in the second server when sending a response to accept the request to synchronize the target subject ID back to the first server. In an event where more than one server (e.g., the second server and a third server) sends a response to accept the request to synchronize the target subject ID, the first server which receives the multiple response (with their respective target subject information and IDs) may select one target subject ID out of the multiple responses based on reference information of respective target subject information for target subject ID synchronization.

Degree of similarity—a degree of similarity indicates how two sets of data, for example one received from a camera or database from another server, and one stored in a database of a server, are similar to each other and thus corresponds to a likelihood that both sets of data relate to a same target subject. In various embodiments, a degree of similarity, as a result of a comparison of two sets of data, is scaled from 0% to 100%, where a degree of similarity of 0% indicates the two sets of data do not contain any similar data and a degree of similarity of 100% indicates that the two sets of data are identical and correspond to a same set of data.

In an embodiment, when a server receives new information from a camera that has not been assigned to a subject ID, the server will compare it against information stored in its database, and, if it exhibits high degree of similarity with a set of data stored in the database, for example the degree of similarity is greater than a threshold value (e.g. >80%), the new information is then assigned to a subject ID associated with that set of data and stored under the subject ID, indicating that a new set of data for a subject with the subject ID has been identified. In contrast, if it exhibits a low degree of similarity with all information stored in the database, for example the degrees of similarity all fall below than a threshold value (e.g., <80%), the new information is then assigned to a new subject ID indicating a new subject has been identified based on the new information.

In another embodiment, when a first server send a request and information relating to a target subject to synchronize a target subject ID to a second server, the second server may compare the information received from the first server against information stored within its own database, and send a response frame to accept such request to synchronize a target subject ID relating to the target subject if both of the information exhibit high degree of similarity, for example the degree of similarity is greater than a threshold value (e.g. >80%). In contrast, if the information received from the first server exhibit a low degree of similarity with all information stored in its database, for example, the degrees of similarity all fall below a threshold value (e.g., <80%), the second server will send a response frame to reject to synchronize the target subject ID, as it does not store any information or subject ID relating to the target subject the first server wish to synchronize.

Reference information—reference information is used herein to refer to server-specific information depicting a characteristic of target subject information of a server. In various embodiments, reference information may be used to determine a relevance and/or a recency of target subject information of a server. Reference information may include, but not limited to, a total count of detections of a target subject (under a target subject ID), a score relating to a degree of facial orientation or frontal face exposure of a target subject in those detections and timestamps of at which the target subject were detected.

During target ID synchronization process, a target subject ID of one particular server may be selected if it is determined that, based on reference information, target subject information received from that one particular server offers greater relevance and recency, for example the reference information of the one particular server have the highest count of detections of the target subject, the most frontal face score and/or the most recent detection of the target subject. The selected target subject ID will then synchronize across servers which sent their respective response frame to accept the request to synchronize their target subject IDs.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "calculating", "determining", "updating", "generating", "initializing", "outputting", "receiving", "retrieving", "identifying", "dispersing", "authenticating" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Exemplary Embodiments

Various embodiments of the present invention relate to methods and apparatuses for estimating an appearance of a first target in a frame, the frame being one in which a second target appears and the first target does not appear.

FIG. 1 depicts an example system 100 used for identifying a target subject 702. A system 100 may comprise one or more cameras (e.g., cameras 100a-c) and each of the cameras may be configured to capture image frames of a location. When an image frame is captured by a camera, (e.g., 100a-c), information (e.g., appearance and facial information) is retrieved from the image frame to identify a subject and assigned to a subject ID relating to a subject by comparing with information stored in a database. Such subject ID is used by the camera to differentiate the subject from other subjects whose information characterized under different subject IDs. The information, the subject ID of the subject and the association between the two may be then stored in the database for further identification of the subject.

In a conventional setting, cameras 100a-c may assign subject IDs ID101, ID201 and ID301 to the detected information and subject in their respective databases. As such, even though all three cameras 100a-100c detected a target subject 702 and received same target subject information (e.g., facial information) at locations 1-3 respectively, due to the different IDs stored in different cameras, camera 100a which stores the information under subject ID ID101 would recognize subject ID ID201 as referring to a different subject and not a same target subject. Such challenge to identify a same subject across multiple camera increases with number of cameras deployed in the system in recent years.

The above conventional system relates to a standalone person ID registry where each face recognition system within the conventional system (a camera and a database) maintain its own subject ID registry stored in the database corresponding to a list of subject detected by that face recognition system (camera).

In particular, each face recognition system, when detecting a new/unknown subject is unregistered in the system, for example, by comparing information obtained from the image frame against all information stored in the database of the face recognition system and determine there is no match on any information associated with existing subject ID registry, automatically register the new/unknown subject and assign an unique subject ID to the new/unknown subject for further identification purpose. The same unregistered subject appearing on different face recognition systems will have different subject IDs in respective system's subject ID registries.

Figure 2:
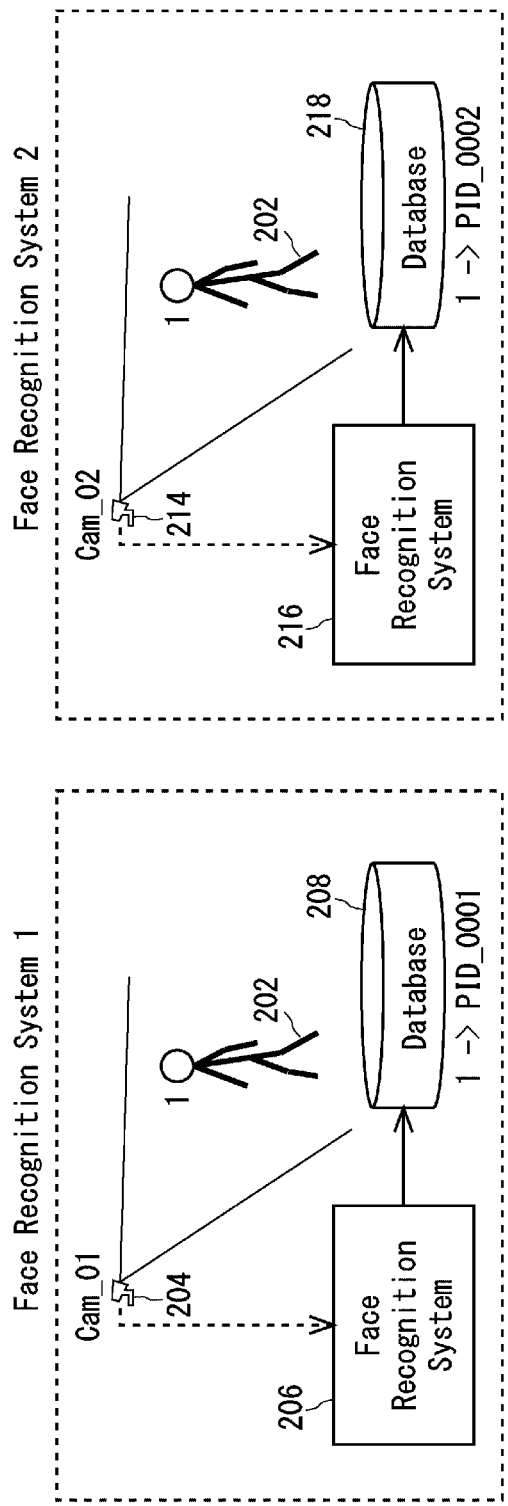
FIG. 2 depicts two example face recognition systems assigning a target subject identification to information relating to a target subject.

FIG. 2 depicts two example face recognition systems 206, 216 having their respective databases 208, 218 and stand-alone subject ID registries. In particular, cameras 204, 214 may capture an image frame each and detect a new/unknown subject 202. Correspondingly, the face recognition systems 206, 216 process the information of the same new/unknown subject 202 obtained from image frame, assign it to subject IDs "PID_0001" and "PID_0002", and store the subject IDs and the information in their databases 208, 218 respectively for further identification of the subject 202. As mentioned earlier, face recognition system 1 206 would recognize its own subject ID "PID_0001" and subject ID "PID_0002" assigned by face recognition system 2 216 as corresponding to different target subjects even though the same or similar target subject information was detected and used in the process of assigning the subject IDs.

Figure 3:
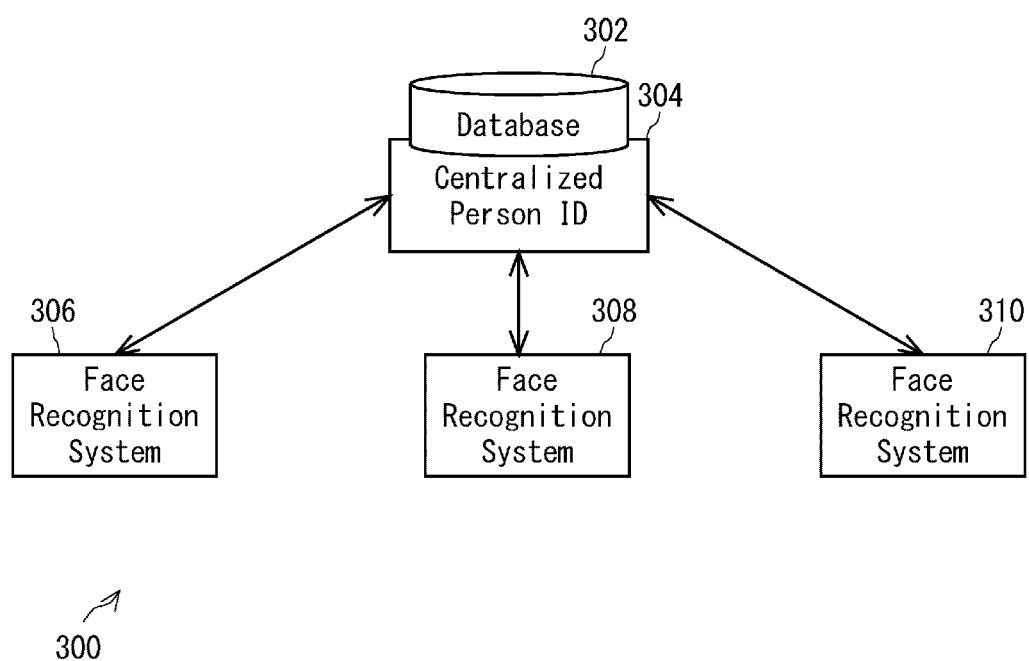
FIG. 3 depicts a block diagram illustrating three face recognition systems forming a centralized shared person ID registry.

FIG. 3 depicts a block diagram illustrating a conventional system 300 comprising three face recognition systems 306, 308, 310 with a database 302 used as centralized shared subject ID registry. Each of the face recognition systems 306, 308, 310 is capable of querying and updating centralized shared subject ID registry 304 in the database 302 to retrieve existing subject ID and store new subject ID. As a same subject ID corresponding to a target subject is retrieved from the database 30, this conventional system 300 is able to identify a same subject appearing across different face recognition systems. However, such conventional system with only a centralized subject ID registry shared across multiple servers, clients or face recognition systems may have low scalability in terms of the number of servers, clients or face recognition systems that can be implemented in and supported by the conventional system. This is because the entire deployment has only a single point of failure, that is, all face recognition systems would not be able to function when the centralized database fails.

Figure 4:
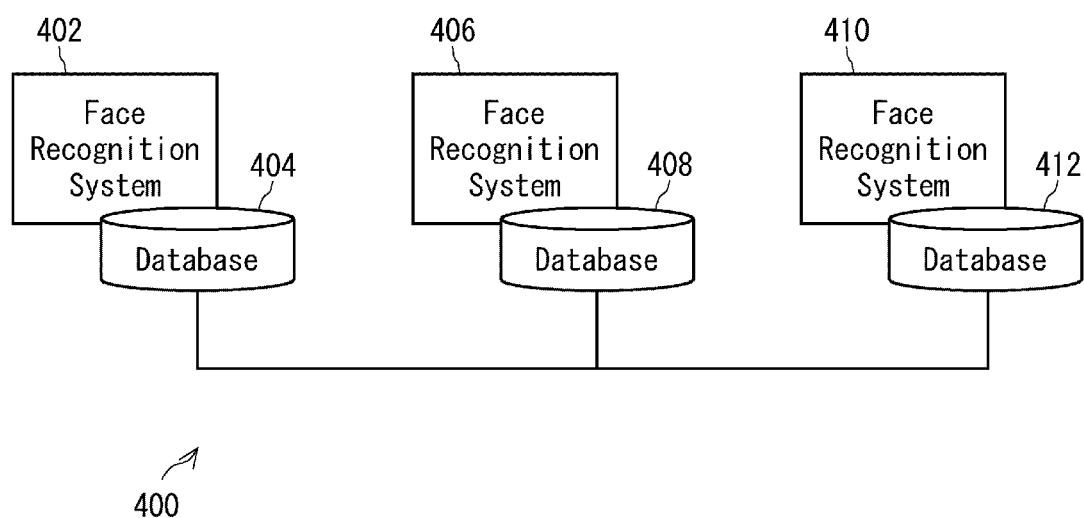
FIG. 4 depicts a block diagram illustrating three face recognition systems forming a decentralized shared person ID registry.

FIG. 4 depicts a block diagram illustrating another conventional system 400 comprising three face recognition systems 402, 406, 408 with respective databases 404, 408, 412, each of the databases used as decentralized shared subject ID registry. Unlike the conventional system 300 in FIG. 3, every face recognition system 402, 406, 410 is associated with a database 404, 408, 412, every databases 404, 408, 412 storing a replication of a full set of data obtained by all face recognition systems 404, 408, 412 within the convention system 400. Each face recognition system may broadcast new data changes to all other face recognition systems such that all data changes are synchronized across all face recognition systems 402, 406, 408 and reflected in all databases 404, 408, 412 within the system 400. Advantageously, a face recognition system under such system 400 is able to function independently even when it is disconnected from all other recognition systems.

Figure 5A:
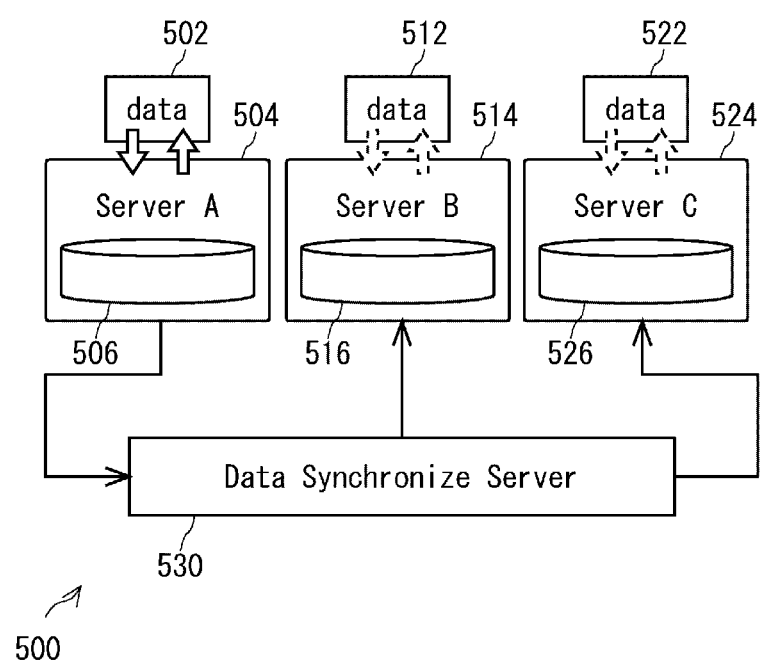
FIG. 5A depicts a block diagram illustrating a conventional system for updating a target subject identification pertaining a target subject in a database of a server.

FIG. 5A depicts a block diagram illustrating a conventional system 500 for updating a target subject identification pertaining a target subject, the conventional system 500 comprising three servers 504, 514, 524 and their respective databases 506, 516, 526 used as decentralized shared subject ID registry. All data 502 received (e.g., from a camera) and stored by Server A 504 in its database 506 will always be sent to Data Synchronize Server 530 and then broadcast to Server B 512 and Server C 522 for synchronization. This flow also applies when Server B 512 and Server C 522 receive the data 512, 522 (e.g., from a camera) and the Data Synchronize Server 530 will broadcast the data 512, 522 to the remaining servers of the system 500. As the data are fully synchronized and replicated across all servers 502, 512, 522, each of the databases 506, 516, 526 holds a full record of data obtained by every server 502, 512, 522.

Figure 5B:
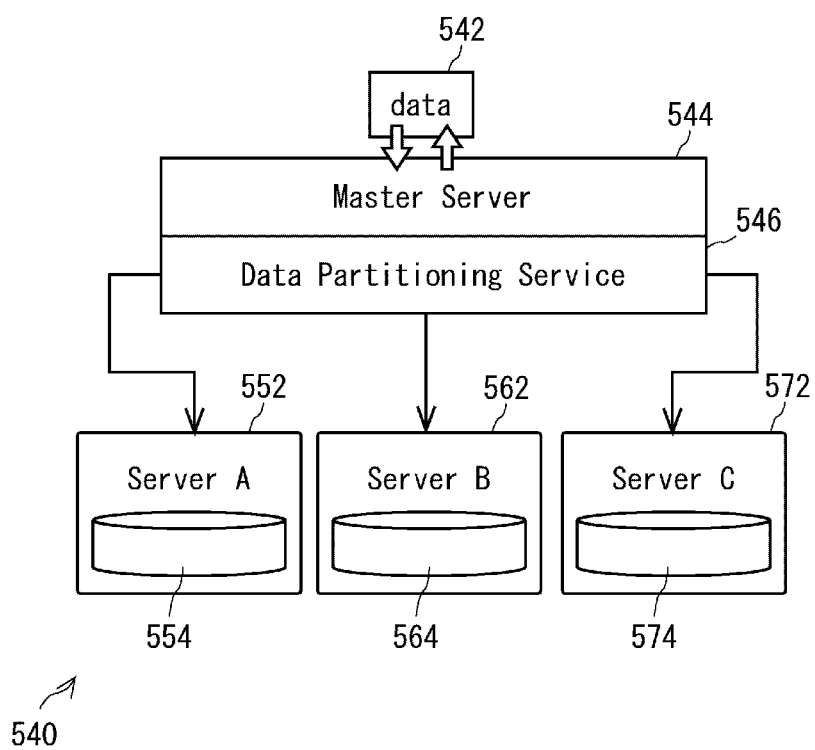
FIG. 5B depict a block diagram illustrating another conventional system for updating a target subject identification pertaining a target subject in a database of a server.

FIG. 5B depicts a block diagram illustrating another conventional system 540 for updating a target subject identification pertaining a target subject in a database of a server, the conventional system 540 comprising three servers 552, 562, 572 and their respective databases 554, 564, 574 used as decentralized shared subject ID registry. All data 542 received by Master Server 544 (e.g., from a camera) will be split by Data Partitioning Service 546 into different partitions and routed to all servers 552, 562, 572 are stored in respective databases 554, 564, 574.

Figure 6A:
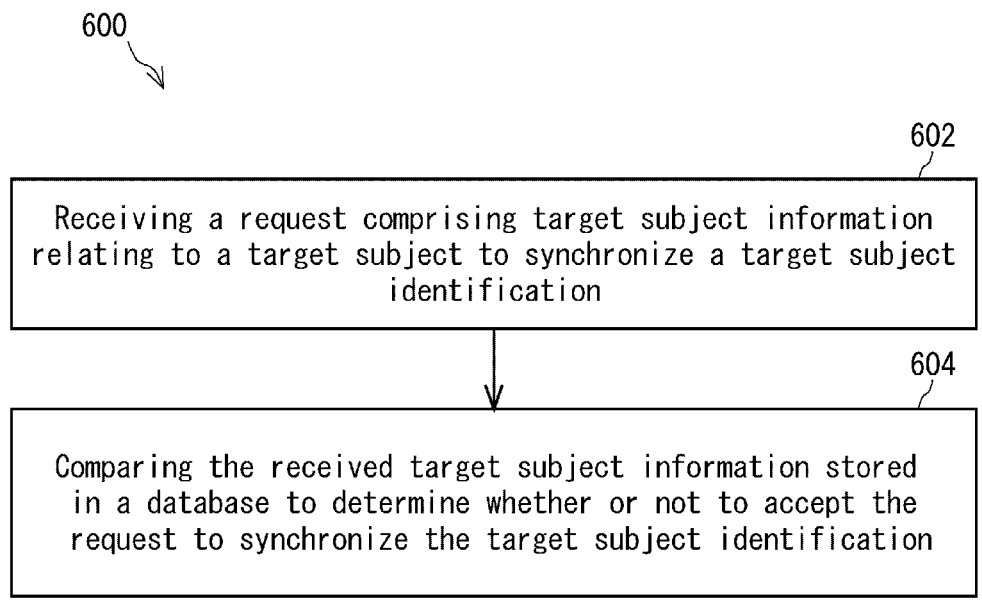
FIG. 6A depicts a flow chart illustrating a method for adaptively updating a target subject identification stored in a database according to the present disclosure.

FIG. 6A depicts a flow chart 600 illustrating a method for adaptively updating a target subject identification stored in a database according to the present disclosure. In step 602, a step of receiving a request comprising target subject information relating to a target subject to synchronize a target subject identification (ID) is carried out. In step 604, a step of comparing the received target subject information stored in a database to determine whether or not to accept the request to synchronize the target subject ID is carried out.

Figure 6B:
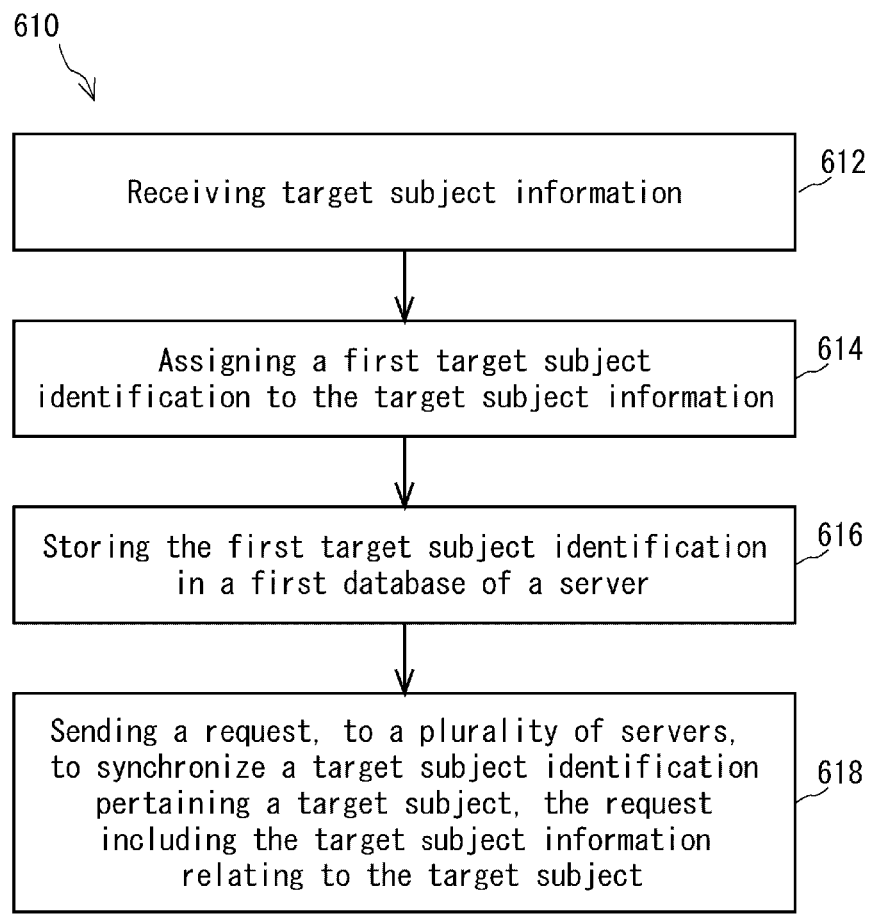
FIG. 6B depicts a flow chart illustrating another method for adaptively updating a target subject identification stored in a database according to the present disclosure.

FIG. 6B depicts a flow chart 610 illustrating another method for adaptively updating a target subject identification stored in a database according to the present disclosure. In step 612, a target subject information is received. In step 614, a step of assigning a first target subject to the target subject information. In step 616, a step of storing the first target subject identification in a first database of a server is carried out. In step 618, a step of sending a request to a plurality of servers to synchronize a target subject ID pertaining a target subject, the request including the target subject information relating to the target subject.

Figure 7:
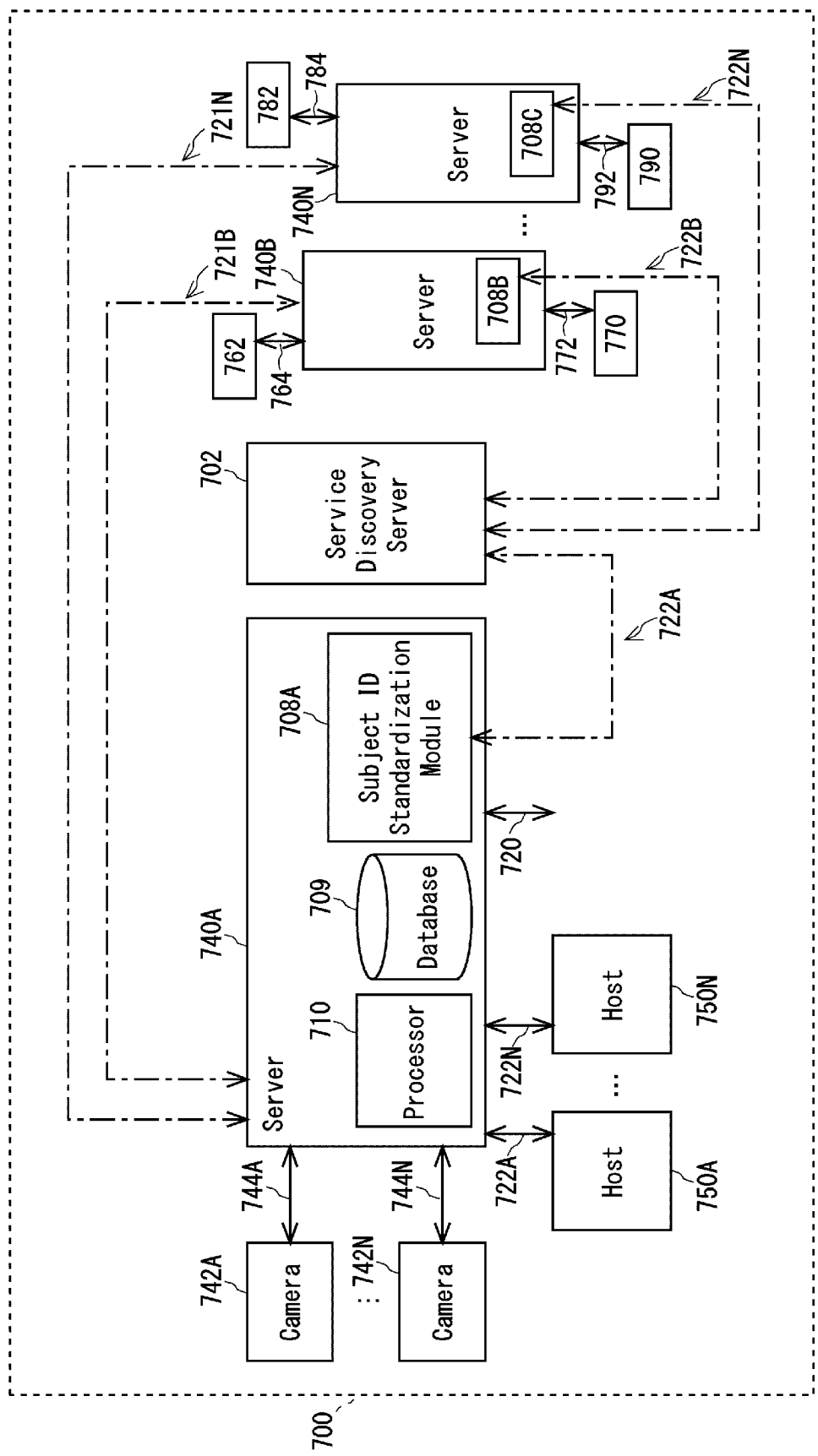
FIG. 7 depicts a block diagram illustrating a system comprising a server for adaptively updating a target subject identification stored in a database according to the present disclosure.

FIG. 7 depicts a block diagram illustrating a system comprising a server for adaptively updating a target subject identification stored in a database according to the present disclosure.

The system 700 comprises servers 740A-740N and a service discovery sever 702, where each of the servers 740A-740N is in communication with a subject ID standardization module 708A, hosts 750A-750N, and cameras 742A-742N. For the sake of simplicity, only components in communication with server 740A are illustrated.

The server 740A is in communication with other servers 740B-740N via a connection 721B-721N respectively. The connections 721B-721N may be wireless (e.g., via NFC communication, Bluetooth, etc.) or over a network (e.g., the Internet). The connections 721B-721N and 722B-722N may also be that of a network (e.g., a local area network, a wide area network, the Internet, etc.). The servers 740A-740N are collectively referred to herein as the servers 740, while the server 740 refers to one of the servers 740.

The server 740 is associated with an entity (e.g., a company or organization or moderator of the service). The server 740A is in communication with a subject ID standardization module 708A. In one arrangement, the subject ID standardization module 708 is owned and operated by the entity operating the server 708A. In an arrangement, the subject ID standardization module 708A may be implemented as a part (e.g., a computer program module, a computing device, etc.) of server 740. In such arrangement, the server 740A and the subject ID standardization module 708 are combined and the connection 720 may be an interconnected bus.

The subject ID standardization module 708A is as described above in the terms description section. The subject ID standardization module server 708 is configured to process processes relating to adaptively update a subject ID stored in the database 709.

A service discovery server 702 of the system 700 is in communication with subject ID standardization modules of all servers 740 (e.g., as indicated by 708 for that of server 740A) via a connection 722A-722N, respectively. The connections 722A-722N may be wireless (e.g., via NFC communication, Bluetooth, etc.) or over a network (e.g., the Internet). The connections 722A-722N may also be that of a network (e.g., a local area network, a wide area network, the Internet, etc.).

The server 740, in turn, is in communication with the hosts 750A to 750N via respective connections 722A to 722N. The connections 722A to 722N may be a network (e.g., the Internet).

The hosts 750A to 750N are servers. The term host is used herein to differentiate between the hosts 750A to 750N and the server 740A. The hosts 750A to 750N are collectively referred to herein as the hosts 750, while the host 750 refers to one of the hosts 750. The hosts 750 may be combined with the server 740.

Cameras 742A to 742N are connected to the server 740 via respective connections 744A to 744N. The cameras 742A to 742N are collectively referred to herein as the camera 742, while the camera 742 refers to one of the cameras 742. The connections 744A to 744N are collectively referred to herein as the connections 744, while the connection 744 refers to one of the connections 744. The connection 744 may be wireless (e.g., via NFC communication, Bluetooth, etc.) or over a network (e.g., the Internet). The camera 744 may be one of an image capturing device, motion sensor and an infrared sensor and may be configured to send a signal, depending on the type of camera, to at least one of the requestor device 702.

In the illustrative embodiment, each of the servers 740A-740N, 750 and/or devices 708, 740 provides an interface to enable communication with other connected servers 740A-740N, 750 and/or devices 708 and 742 and/or servers 702, 740, and 750. Such communication is facilitated by an application programming interface ("API"). Such APIs may be part of a user interface that may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof. For example, it is possible for each of the servers 740A-740N to send an alert signal when a user presses a panic button on the GUI, while doing an exercise. Similarly, it is possible to make a request to synchronize subject IDs from a server 740 across the servers 740A-740N.

The server 740A, the host 750 and/or the subject ID standardization module are in communication with a database 709. In one arrangement, as shown in FIG. 7, the server 740A and database 709 are combined. In another arrangement, the server 740A and the database 709 may be separate and connected via an interconnected bus.

Use of the term 'server' herein can mean a single computing device comprising a processor (e.g., processor 710 of Server 740A) a plurality of interconnected computing devices which operate together, each of which comprising a processor (e.g., processor 710 of Server 740A), to perform a particular function. That is, the server may be contained within a single hardware unit or be distributed among several or many different hardware units.

The server 740 is also configured to manage the registration of users. A registered user has a remote access account (see the discussion above) which includes details of the user stored in the database 709. The registration step is called on-boarding. A user may use either the host 750 to perform on-boarding to the subject ID standardization module 702 and the service discovery server 702.

It is not necessary to have an account at the server 740 to access the functionalities of the server 740. That is, in some embodiments, the subject ID standardization module server 708 and the service discovery server 702 may perform the functionalities of a server 740. However, there are functions that are available to a registered user. For example, it may be possible to send a request/response, to another server within the system 700, to synchronize a subject ID stored in the database 709. These functions will be discussed below.

The on-boarding process for a user is performed by the user through host 750. In one arrangement, the user downloads an app (which includes the API to interact with the server 740) to the camera 742. In another arrangement, the user accesses a website which includes the API to interact with the server 740. The user is then able to interact with the server 740 to via the camera 742 that is paired with the user.

Details of the registration include, for example, name of the user, address of the user, emergency contact and the camera that is authorized to update the account, and the like. Once on-boarded, the user would have an account that stores all the details in the database 709.

The Hosts 750

The host 750 is a server associated with an entity (e.g., a company or organization) or a subject (requestor) which manages (e.g., establishes, administers) resources relating to subject IDs registry. The host 750 may be a computing device such as a desktop computer, an interactive voice response (IVR) system, a smartphone, a laptop computer, a personal digital assistant computer (PDA), a mobile computer, a tablet computer, and the like. In one example arrangement, the host 750 is a computing device in a watch or similar wearable and is fitted with a wireless communications interface.

In one arrangement, the entity is a central safety manager. Therefore, each entity operates a host 750 to manage the resources by that entity. The host 750 may be a security monitoring system, or one that stores information and subject relating to a subject or other operations. The host 702 is associated with a subject (or requestor) who is a party to a request to adaptively update subject IDs stored in the database 709. In an example, the host 750 may be one managed by a security officer of the entity and the server 740 is a central server that manages data from each of the hosts 750.

In one arrangement, the subject IDs stored in the database 709 can be automatically updated for accounts associated with all hosts 750. Advantageously, this allows subject IDs stored for all hosts 750A-750N in the database 709 are all adaptively updated and synchronized with those stored in respective databases of all other servers 740B-740N in the system 700.

Camera 742

The camera 742 is associated with a user associated with the server 740A. More details of how the camera may be utilized will be illustrated in FIGS. 8A, 8B and 11-13 and their accompanying description below.

In an embodiment, the camera is one configured to obtain target subject information.

Subject ID Standardization Module 708

The subject ID standardization module 708A-708N is a module within a server 740 utilized in the operations of adaptively updating and synchronization of a subject ID with other servers 740. The subject ID standardization modules 708A-780N within the system 700 are in communication with each other through a service discovery server 702 via connections 722A-N respectively. In one arrangement, the subject ID standardization modules 708A-780N are in communication with each other directly through the servers' main communication connections 721B-721N. The subject ID standardization modules 708A-708N are collectively referred to herein as the subject ID standardization module 708, while the subject ID standardization module 708 refers to one of the subject ID standardization modules 708.

The subject ID standardization module 708 is configured to manage and direct requests and responses to synchronize a subject ID stored in the databases 709 from one subject ID standardization module of a server to another to appropriately perform the subject ID synchronization process by and across the servers 740 within the system 700.

Service Discovery Server 702

In an embodiment, when server 740A initiates a subject ID standardization process to adaptively update its subject ID registry stored in the database 709 and synchronize its subject IDs with those stored in respective databases of other servers within the system 700, the server 740A may send a request to Service Discovery Server 702 via the Subject ID Standardization module 708 to obtains a list of connected Subject ID Standardization modules within the network, e.g. those connected with servers 740B-740N within the system 700 via connections 722B-722N respectively. Once the list of connected Subject ID Standardization modules have been obtained, server 740A may then send a request to other servers 722B-722N synchronize a subject ID (s).

Figure 8A:
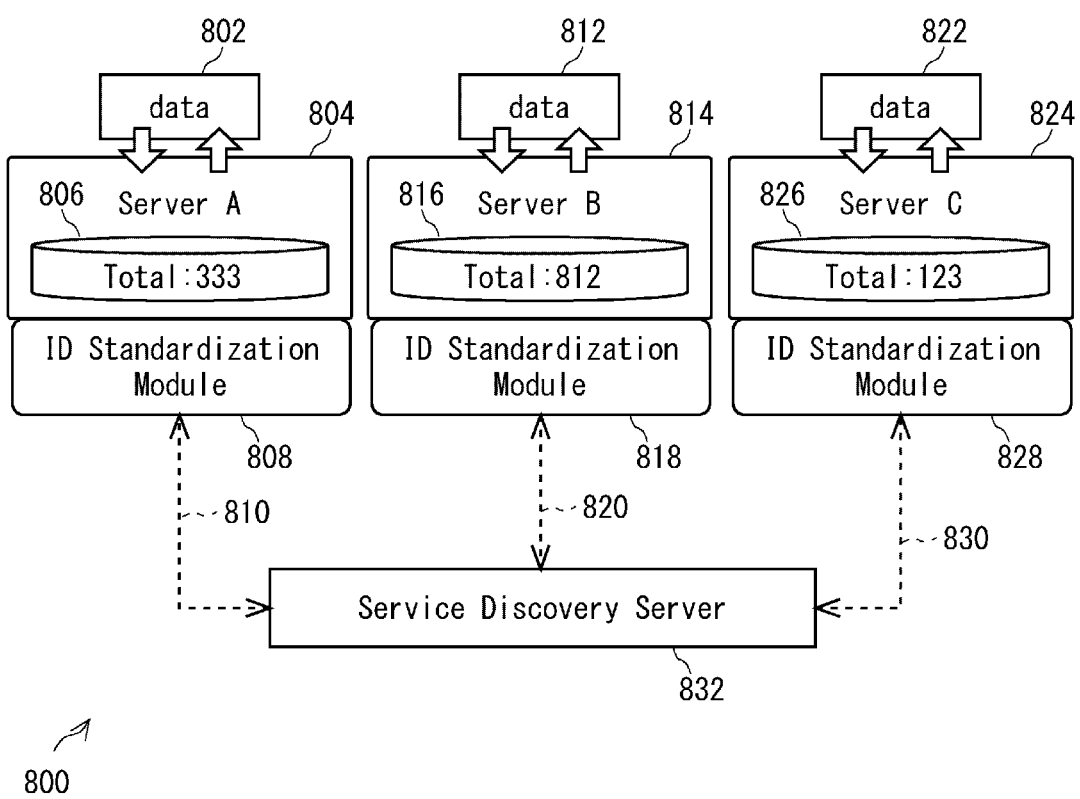
FIG. 8A depicts a block diagram illustrating a system comprising three servers for adaptively updating a target subject identification stored in a database according to various embodiments of the present disclosure.
Figure 8B:
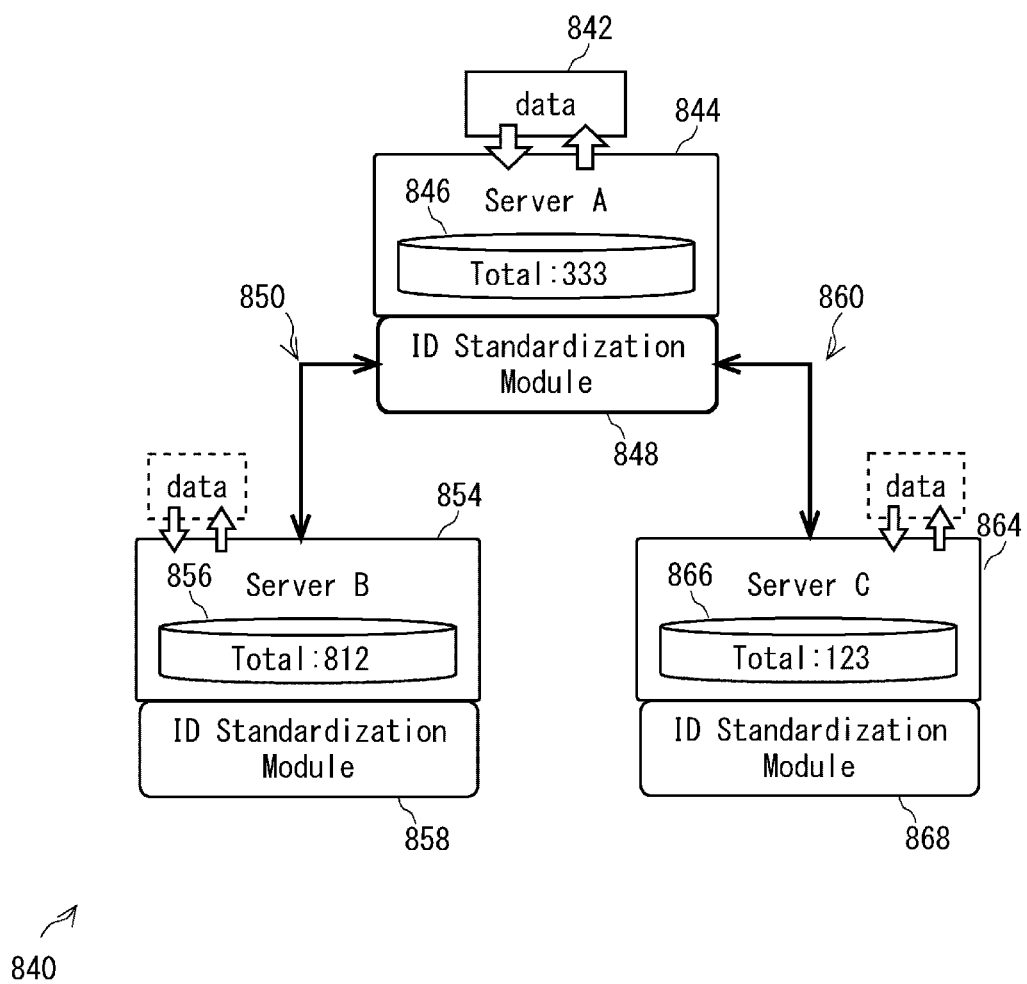
FIG. 8B depicts a block diagram illustrating a system comprising three servers for adaptively updating a target subject identification stored in a database according to various embodiments of the present disclosure.

FIGS. 8A and 8B depict block diagrams illustrating a system comprising three servers for adaptively updating a target subject identification stored in a database according to various embodiments of the present disclosure.

According to the present disclosure, only new set of data or information relating a target subject received by a server will be send to ID standardization module resided in the server and share with ID standardization modules of other servers to synchronize a target subject ID.

FIG. 8A depicts a block diagram 800 illustrating a system comprising three servers 802, 812, 822 for adaptively updating a target subject ID stored in respective databases 806, 816, 826 according to various embodiments of the present disclosure. The databases 806, 816, 826 of Servers A-C 804, 814, 824 store respective list of subject IDs based on the sets of data received by Servers A-C 804, 814, 824 respectively.

In this embodiment, Servers A-C have received and stored 333, 812 and 123 sets of data. Each set of data may relate to a detection of a subject at a time point using one or more cameras in communication with each of the Servers A-C, and is assigned to a subject ID identifying a subject. It is appreciated that a single subject ID stored within a server 802, 812, 822 may associate with two or more sets of data if they exhibit high degree of similarity, for example when they were obtained from a same subject. In one arrangement, such two or more set of data associating with a single subject ID may be grouped as a subject group or a person group, or in some embodiments below similar subject/person Group.

Server A 804 may receive a new set of data from a data source 802 and compare it against each set of data stored in the database 806 to determine if the new set of data matches with any one set of data stored in the database 806. Server A 804 identifies the new set of data (hereinafter referred to as "new data") matches substantially with a matching set of data (hereinafter referred to as "matched data") associated with a subject ID stored in the database 806 and thus assigning the new set of data to the subject ID identifying to a (known) subject. Similarly, Server B 814 and Server C 824 may receive new data from respective data sources 812, 822 and compare them against each set of data stored in respective databases 816, 826 to determine matched data stored in the databases 816, 826 and assign the new data 812, 822 to the respective subject IDs associated with matched data.

Each of the Servers A-C 804, 814, 824 may be equipped with an ID standardization module 808, 818, 828 that is utilized to update and synchronize subject IDs stored in the databases 806, 816, 826. All ID standardization modules 808, 818, 823 within the system may be in further communication with a Service Discovery Server 832 via connections 810, 820, 830 respectively. Each ID standardization module 808, 818, 823 will register and update its online and offline states with the Service Discovery Server 832.

As mentioned earlier, even a same set of data identifying one subject received by different servers 802, 812, 822 may be assigned to different subject IDs and stored in respective databases 806, 818, 828 in different servers 802, 812, 822. There is thus a need to adaptively update the subject IDs identifying a same subject across different servers 802, 812, 822 and synchronize them into a single subject ID used across different servers 802, 812, 822.

According to the present disclosure, only new data or information relating a target subject received by a server will be send to ID standardization module resided in the server and share with ID standardization modules of other servers to synchronize a target subject ID.

When Server A 804 receives a new set of data from the data source 802 that does not match substantially with any one set of data stored in the database 806, Server A 802 may identify the new set of data to be associated with a target subject and assign a target subject ID to the new set of data. The target subject ID can be used to assign to any further new set of data identifying the target subject, i.e., substantially similar to the new set of data, received by Server A 802.

Such target subject ID created by Server A 804 for identifying the target subject may be adaptively updated and synchronized with other servers 812, 822. Server A 804 may send a request to synchronize the target subject ID by sending the target subject ID together with the associated data to its own ID standardization module 808. As such, an ID standardization process is then activated.

The ID standardization module 808 of Server A 804 may obtain a list of connected (or online) ID standardization modules, such as ID standardization modules 818, 828 of Servers B and C 814, 824 through Service Discovery Server 832. The ID standardization module may then forward the request with the target subject ID and the data to Server B 814 and Server C 824 through the Service Discovery Server 832. Server B 814 and Server C 824 may compare the set of data received from Server A 804 against the sets of data stored in their respective databases 816, 826, and subsequently send a response to Server A via the same connections 810, 820, 830 to accept or reject such request. In an embodiment, both Servers B and C 814, 824 may participate with the ID standardization process by accepting the request from Server A 804 and sending respective responses back to Server A 804. Such responses contain matched data which matches substantially with the set of data sent out by Server A 804 and corresponding target subject IDs stored in respective databases 816, 826 of Servers B and C 814, 824. Server A 804 which receives the responses, the matched data and the target subject IDs from the participating Servers B and C 814, 824 will then select one target subject ID among the target subject IDs of all participating Servers A-C 804, 814, 824 and synchronize the selected one target subject ID across all participating Servers A-C 804, 814, 824, i.e. the subject IDs previously stored in databases of all participating Servers A-C 804, 814, 824 for identifying the target subject will be replaced by the selected one target subject ID for further identification of the target subject and assignment of the target subject ID.

FIG. 8B depicts a block diagram 840 illustrating a system comprising three servers 844, 854, 864 for adaptively updating a target subject ID stored in respective databases 846, 856, 866 according to various embodiments of the present disclosure. The databases 846, 856, 866 of Servers A-C 844, 854, 864 store respective list of subject IDs based on the sets of data received by Servers A-C 846, 856, 866 respectively. The operations of Servers A-C 844, 854, 864 in FIG. 8B are similar to Servers A-C 804, 814, 824 in FIG. 8A except that there is no Service Discovery Server in communication with the ID standardization modules 848, 858, 868 equipped in Servers A-C 844, 854, 864 to keep track of the online and offline states of each ID standardization module 848, 858, 868. Instead, each server directly communicates with other servers via their ID standardization modules 848, 858, 868 for the operations of update and synchronization of subject IDs stored in their respective databases 846, 856, 866.

In particular, when Server A 844 receives a new set of data from the data source 842 (e.g., one or more cameras in communication with the Server A) that does not matches substantially with any one set of data stored in the database 846, Server A 844 may identify the new set of data to be associated with a target subject and assign a target subject ID to the new set of data. The target subject ID can be used to assign to any further new set of data identifying the target subject, i.e., substantially similar to the new set of data, received by Server A 842. The target subject ID created by Server A 842 for identifying the target subject may be adaptively updated and synchronized with Servers B and C 854, 864. Server A 804 may send a request to synchronize the target subject ID by sending the target subject ID together with the associated data to its own ID standardization module 808 which further directs the request directly to the ID standardization modules 858, 868 of Servers B and C 854, 864 via connections 850, 860 respectively. As such, an ID standardization process is then activated.

Subsequently, Server B 854 and Server C 864 may compare the set of data received from Server A 844 against the sets of data stored in their respective databases 856, 866, and subsequently send a response to Server A via the same connections 850, 860 to accept or reject such request. In an event where both Servers B and C 814, 824 participate with the ID standardization process and accept the request from Server A 804, Servers B and C 854, 864 send responses contain sets of data which matches substantially with the set of data sent out by Server A 804 and corresponding target subject IDs stored in their respective databases 856, 866. Server A 844 which receives the responses, the matched data and the target subject IDs from the participating Servers B and C 854, 864 will then select one target subject ID among the target subject IDs of all participating Servers A-C 844, 854, 864 to across all participating Servers A-C 844, 854, 864. The selected target subject ID will replace all subject IDs previously stored in databases in Servers A-C 804, 814, 824 identifying the target subject for further identification of the target subject and assignment of the target subject ID.

Figure 9:
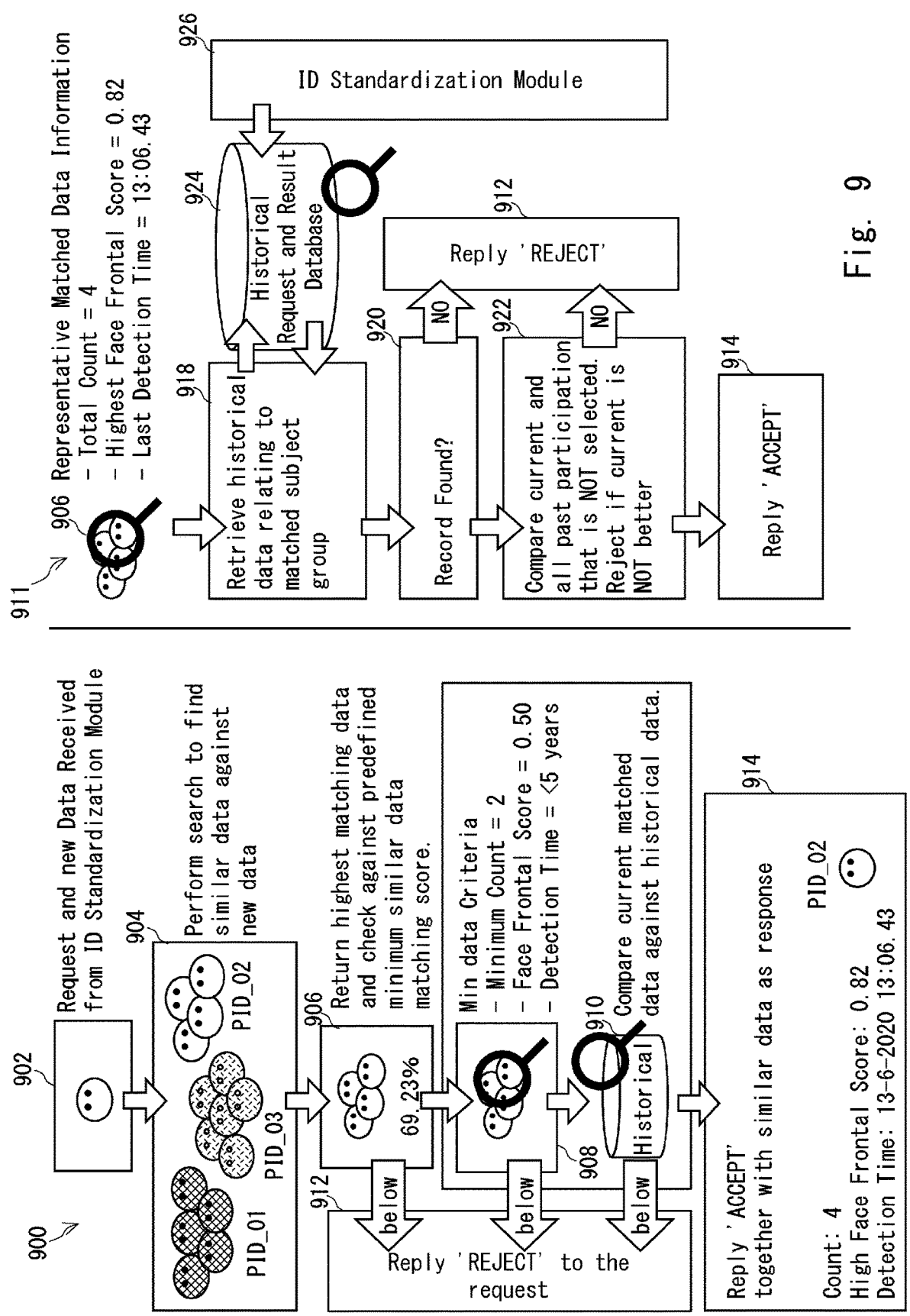
FIG. 9 depicts a flow diagram illustrating a process of receiving a request and sending a response to synchronize a target subject ID according to an embodiment.

FIG. 9 depicts a flow diagram 900 illustrating a process of receiving a request and sending a response to synchronize a target subject ID according to an embodiment. A request 902 to synchronize a target subject ID is received from an ID Standardization Module of a server. The request 902 may include the target subject ID stored by that server and the associated data identifying the target subject (hereinafter referred to as "new data"). Upon receiving the request, it is determined whether or not to accept such request to synchronize the target subject ID and send a result of the determination (accept or reject the request) back to the server. A step of performing search and compare against each set of data stored in the database 904 (hereinafter referred to as "stored data") to find a set of data that is similar to the new data. In this example, the database stores three subject group with respective subject IDs identifying three different subjects. There are five sets of data under subject ID "PID_01" (five detections of subject 1), four sets of data under subject ID "PID_02" (four detections of subject 2) and six sets of data under subject ID "PID_03" (six detections of subject 3) stored in the database.

A matching score indicating a degree of similarity between the new data and the stored data is calculated for each comparison. The matching score may be expressed in percentage and scaled from 0% to 100%. A degree of similarity of 0% indicates the new data and the stored data do not contain any similar data, and a degree of similarity of 100% indicates that the new data is identical to the stored data are identical and correspond to a same set of data.

In one example, the data under a subject group is identified as the closest match (highest matching set of data) to the received set of data in the request 902 when one set of data under the subject group has the highest matching score. In another example, the data under a subject group is identified as the closest match to the received set of data in the request 902 when all sets of data under the subject group present the highest matching score in average.

In this embodiment, the data under a subject group 906 with subject ID "PID_02" (hereinafter referred to as "matched data", "matched group" and "matched subject ID" respectively) is identified to be the closest match to the received set of data in the request 902 with a matching score of 69.23%, and thus is retrieved for further examination. According to the present disclosure, the matching score of the matched data is checked against a pre-defined minimum similar data matching score. If the matching score is lower than the pre-defined minimum score, step 912 is carried out where a response is generated to reject the request 902 to synchronize the target subject ID. This eliminates matched data which a degree of similarity is not up to a desired level, and only allows matched data that are substantially similar to the received data in the subsequent selection process.

If the matching score is higher than the pre-defined minimum score, step 908 is carried out. A set of reference data of the matched group, such as a count of detections, a face frontal score and a last detection time, is retrieved and check against a corresponding set of data criteria. In this embodiment, the matched data 906 is checked if their reference data meets the criteria of at least a minimum count of two detections, the highest face frontal score of 0.50 and the last detection time of less than 5 years. If their reference data do not meet at least one of the criteria, step 912 is carried out where a reject response is generated.

In this embodiment, the matched data 906 present a total count of four detections, the highest face frontal score of 0.82 and the last detection time of 1:06:43 pm on 13 Jun. 2020. The set of reference data of the matched data 906 meets all the criteria and therefore the next step 910 may be carried out.

In step 910, a step of comparing the current matched data against historical data. Historical data may include the set of data identifying a target subject associated with every request received from another server to synchronize the target subject ID, the matched data included in every response to accept such a request, as well as the selected target subject ID received as a result of every target subject IDs selection process prior to receiving the request 902. In an embodiment, if no record of historical data relating to the matched group can be found, step 910 is skipped to step 914. Further details of the processing of the step 910 comprising steps 918, 920, 922, 928 and 930 are illustrated in a flow chart 911 and the following text.

Referring to the flow chart 911, in step 918 of step 910, the historical data relating to the matched subject group and matched subject ID "PID_0002" are retrieved. Such historical data may be stored in a historical request and result database 924 separated from the database storing the subject IDs and associated sets of data identifying the subjects. In step 920, it is determined if there is any record of accepting a previous request relating to the matched group and matched subject ID "PID_0002". If there is no record found, step 912 may be carried out where a response to reject the request 902 is generated.

If at least one record of accepting to a previous request relating to the matched group and matched subject ID is found, step 922 is carried out. In step 922, the current matched data 906 are compared against the historical data associated with the previous request. In an embodiment, the compression utilizes the corresponding reference information of the matched data and the historical data. If it is determined that the current matched data is better than the historical data based on their reference information, e.g., more count of detections, greater face front score and/or greater recency in the detection time, step 930 is carried out where a response 914 to accept the request 902 is carried out. The response comprises (i) the matched subject ID, (ii) either the matched data 908 or one set of data of the matched subject group with the highest matching score, (iii) the reference data of the matched data 908. Otherwise, step 912 is carried out where a response is generated to reject the request 902 to synchronize the target subject ID.

In various embodiments, after the response and many other responses from other servers have been sent back to the server in response to the same request 902. The server may initiate a subject ID selection process to select one subject ID out of the subject IDs in those responses received from respective servers. In an embodiment, the selection result and the selected subject ID may then be transmitted back to the ID standardization module 926 of every server which responded and accepted the request, and the selected subject ID will then be used by the server to update and replace the matched ID stored in the server. In another embodiment, the selection result and the selected subject ID will be transmitted to all connected servers within the system and store in their respective historical request and result databases 924 for further comparison purpose. According to an embodiment, the selection process may utilize the corresponding reference information included in the responses. More details on the selection process will be discussed in FIG. 10 and the following description.

Figure 10A:
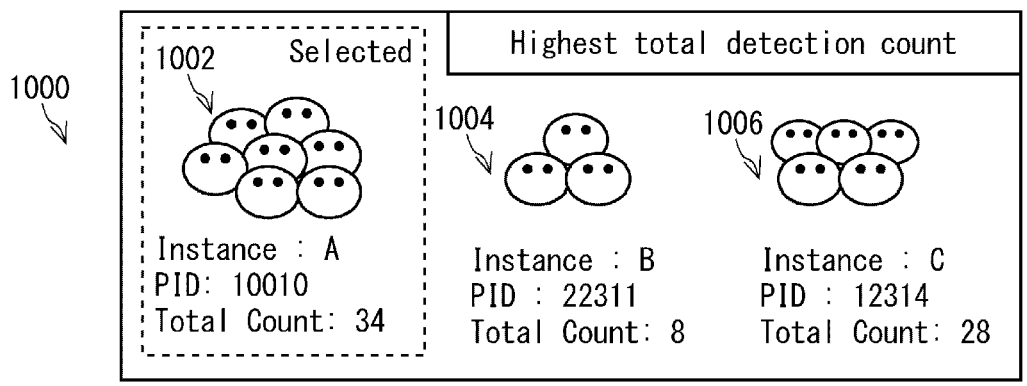
FIG. 10A depicts a schematic diagram illustrating three responses received from three servers (e.g., Servers A-C), each response comprising data and a target subject ID identifying a target subject, and a selection process to select one of the three subject IDs according to three embodiments of the present disclosure respectively.

FIG. 10A depicts a schematic diagram 1000 illustrating three responses 1002, 1004, 1006 received from three servers (e.g., Servers A-C), each response comprising data and a target subject ID identifying a target subject, and a selection process to select one of the three subject IDs according to an embodiment of the present disclosure. In this embodiment, selection of the target subject ID is based on reference information relating to a highest total detection count of the target subject, for example by calculating the number of sets of data in the target subject group associated with the target subject ID. The responses 1002, 1004, 1006 received from Servers A-C have a count of detection of the target subject of 34, 8 and 28 respectively. As a result, the data in the response 1002 are selected and the corresponding target subject ID 10010 stored in Server A is then used for synchronization of target subject IDs across Servers A-C. In other words, the target subject IDs 22311 and 12314 identifying the target subject stored in Servers B and C respectively will be replaced by target subject ID 10010, and the target subject ID 10010 now synchronously refers the target subject across Servers A-C.

Figure 10B:
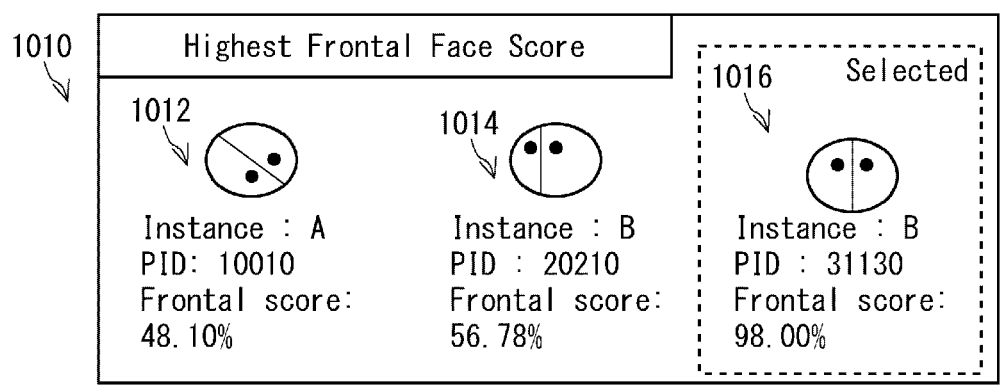
FIG. 10B depicts a schematic diagram illustrating three responses received from three servers (e.g., Servers A-C), each response comprising data and a target subject ID identifying a target subject, and a selection process to select one of the three subject IDs according to three embodiments of the present disclosure respectively.

FIG. 10B depicts a schematic diagram 1010 illustrating three responses 1012, 1014, 1016 received from three servers (e.g., Servers A-C), each response comprising data and a target subject ID identifying a target subject, and a selection process to select one of the three subject IDs according to another embodiment of the present disclosure. In this embodiment, selection of the target subject ID is based on reference information relating to the highest frontal face score of a set of data identifying the target subject. In an embodiment, a frontal face score is calculated based on the angle and orientation of the face relative to the angle facing the camera capturing the facial information and/or the exposed area of face. In this example, the highest frontal face score of a set of data out of all sets of data included in the responses received from Servers A-C are 48.10%, 56.78% and 98.00% respectively. As a result, the data in the response 1016 are selected and the corresponding target subject ID 31130 stored in Server C is then used for synchronization of target subject IDs across Servers A-C. In other words, the target subject IDs 10010 and 20210 identifying the target subject stored in Servers A and B respectively will be replaced by target subject ID 10010, and the target subject ID 10010 now synchronously refers the target subject across Servers A-C.

Figure 10C:
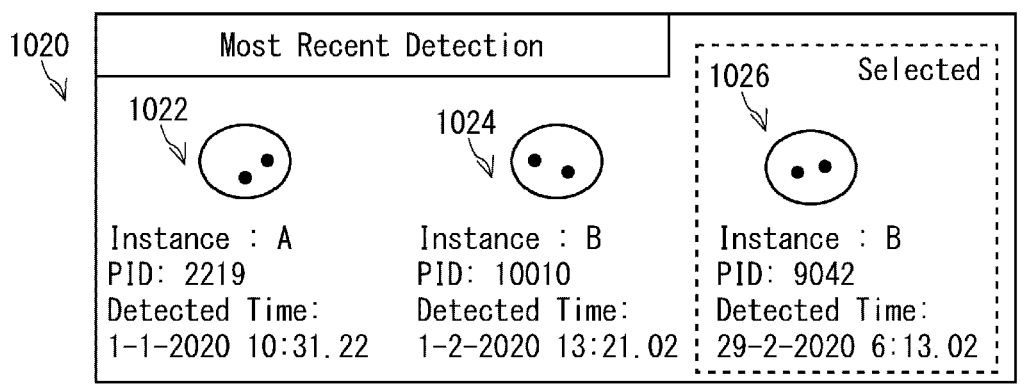
FIG. 10C depicts a schematic diagram illustrating three responses received from three servers (e.g., Servers A-C), each response comprising data and a target subject ID identifying a target subject, and a selection process to select one of the three subject IDs according to three embodiments of the present disclosure respectively.

FIG. 10C depicts a schematic diagram 1020 illustrating three responses 1022, 1024, 1026 received from three servers (e.g., Servers A-C), each response comprising data and a target subject ID identifying a target subject, and a selection process to select one of the three subject IDs according to yet another embodiment of the present disclosure. In this embodiment, selection of the target subject ID is based on reference information relating to the most recent detection of the target subject. In the responses 1022, 1024, 1026, Servers A-C last detected the target subject on 1 Jan. 2020, 1 Feb. 2020 and 29 Feb. 2020 respectively. As such, the data in the response 1026 from Server C has the most recent detection of the target subject. As a result, the data in the response 1026 are selected and the corresponding target subject ID 9042 stored in Server C is then used for synchronization of target subject IDs across Servers A-C. In other words, the target subject IDs 2219 and 10010 identifying the target subject stored in Servers A and B respectively will be replaced by target subject ID 9042, and the target subject ID 9042 now synchronously refers the target subject across Servers A-C.

Figure 11:
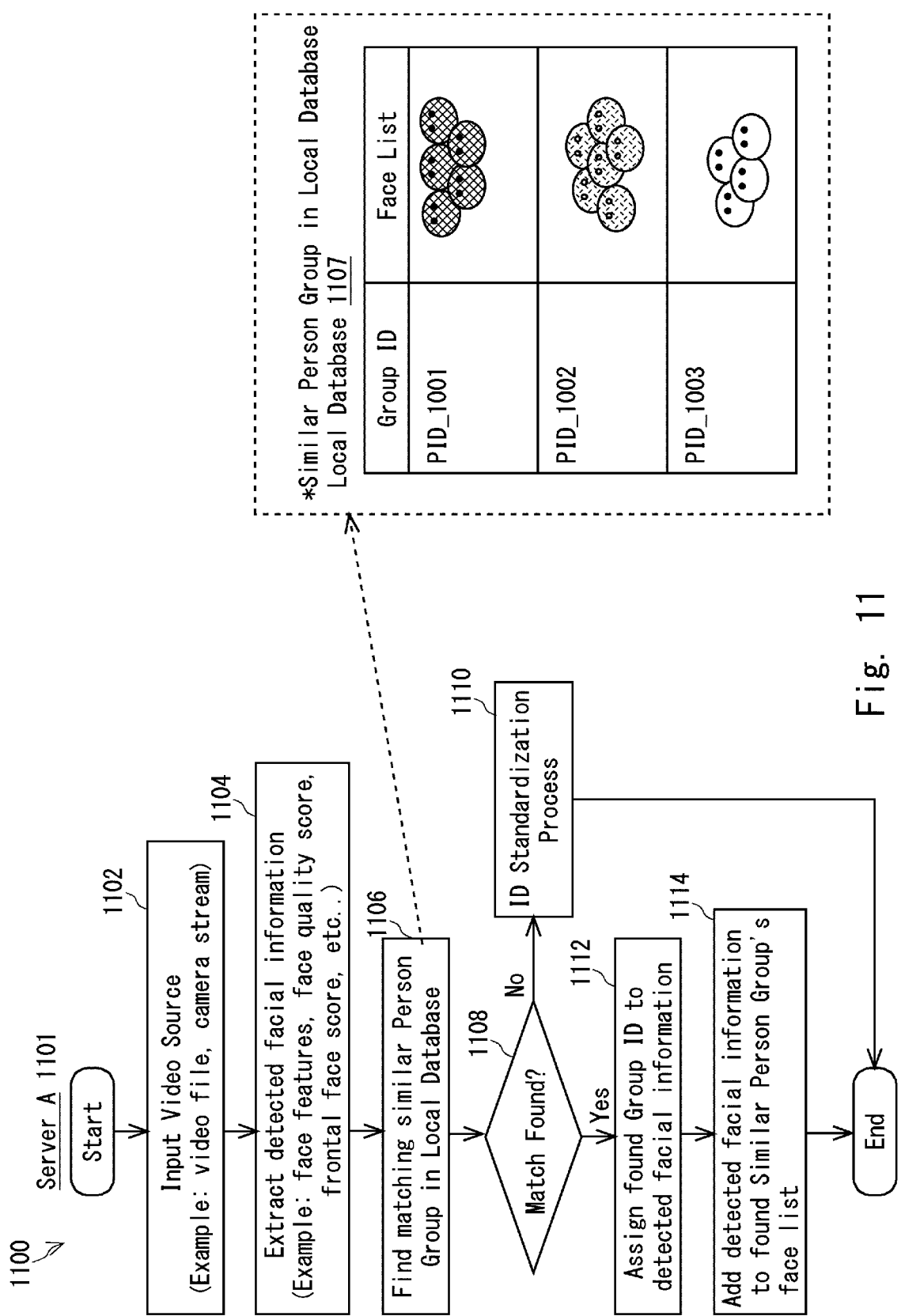
FIG. 11 depicts a flow chart illustrating a process of comparing receive target subject information against information stored in a database of a server according to an embodiment of the present disclosure.

FIG. 11 depicts a flow chart 1100 illustrating a process of comparing received target subject information (data) against information stored in a database of a server according to an embodiment of the present disclosure. In this embodiment, the process is carried out by Server A 1101. The process may start in step 1102 where a video or an image frame is received from a video source input (for example one or more cameras in communication with the server) in the form of video file or camera stream. In step 1104, a set of facial information identifying a subject is detected (hereinafter referred to as "new facial information") from an image frame from the video source. Reference information of the facial information such as face quality score, frontal face score may also be calculated from the set of facial information. In step 1106, the new facial information is then compared against a list of facial information stored in a local database 1107 of Server A to find a matching subject group (associated with a subject ID), specifically Similar Person Group (associated with Group ID) in this example. In the list of facial information, there are five sets of facial information (five detections of subject 1) stored under Group ID "PID_1001", six sets of facial information (six detections of subject 2) stored under Similar Person Group ID "PID_1002" and four sets of facial information (four detections of subject 3) stored under Group ID "PID_1003" in the database 1107. In particular, in step 1106, each set of facial information identifying a subject stored in the database is compare against the new facial information in step 1104. A matching score is calculated for each comparison indicating a degree of similarity between the new facial information and the set of facial information stored in the database.

In step 1108, it is determined if a match is found. In an embodiment of the present disclosure, a match is found when the matching score of comparing a set of facial information stored in the database 1107 and the new facial information is greater than a pre-defined minimum matching score, and the match will be the corresponding Similar Person Group (and the Group ID) assigned to such facial information. In another embodiment of the present disclosure, if more than one set of facial information stored in the database 1107 has a matching score greater than the pre-defined minimum matching score, the match will be the subject group associated with the set of facial information exhibiting the highest matching score (hereinafter referred to as "matched group" and "matched facial information" respectively).

If a match is found in step 1108, step 1112 is carried out. The new facial information will be assigned to the Group ID corresponding to the matched group and matched facial information with the highest matching score. The new facial information will be then stored in the database as part of the list of facial information associated with the Similar Person Group under the Group ID. On the other hand, if no match is found, for example, none of the sets of facial information has a matching score higher than the pre-defined minimum matching score, an ID standardization process is initiated in step 1110. More details of the ID standardization process are elaborated in the following text and in steps 1214-1244 and 1322-1328 in FIGS. 12 and 13 respectively.

Figure 12A:
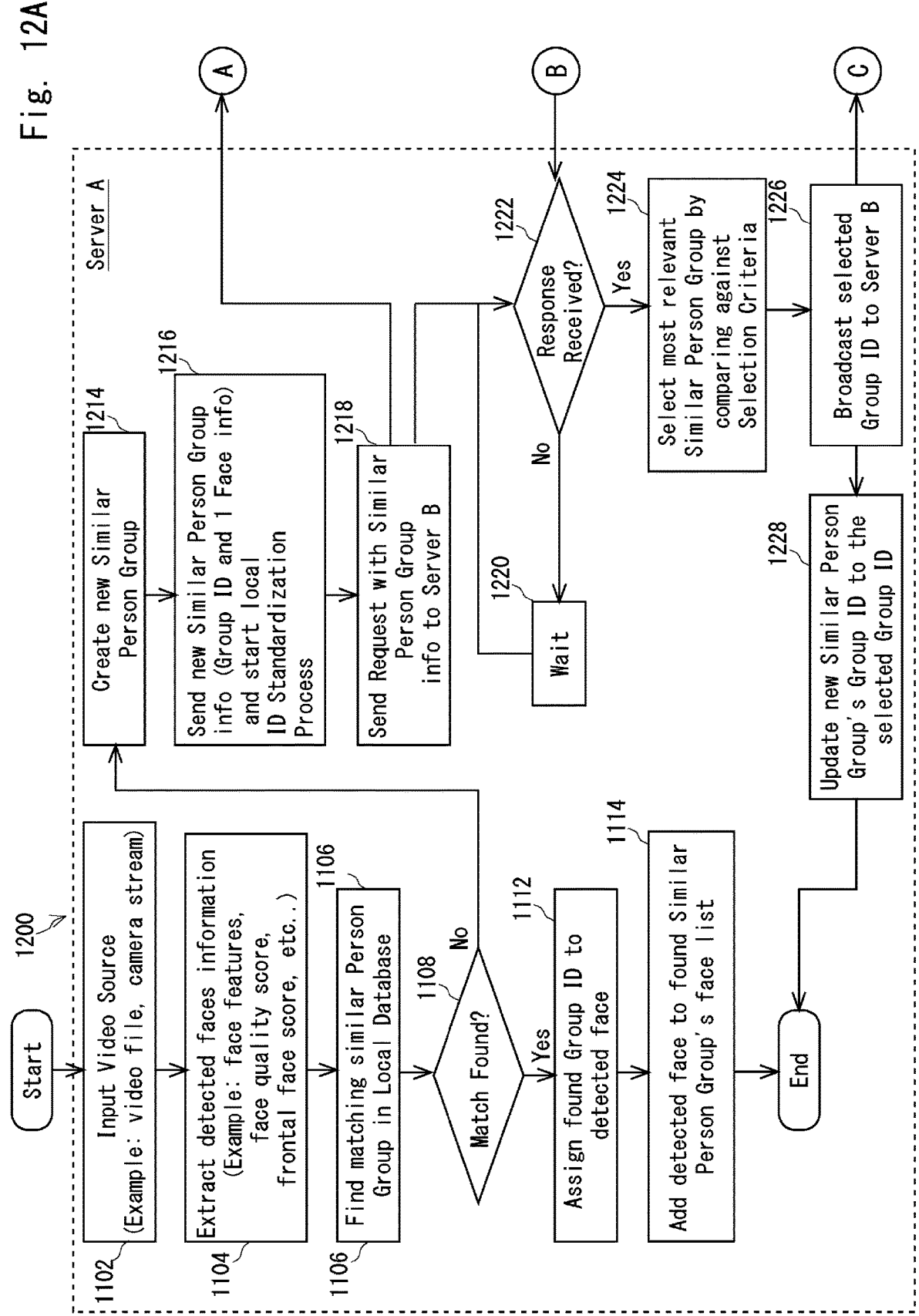
FIG. 12A depicts a flow chart illustrating a process of adaptively updating a target subject identification stored in a database of a server according an embodiment of the present disclosure.
Figure 12B:
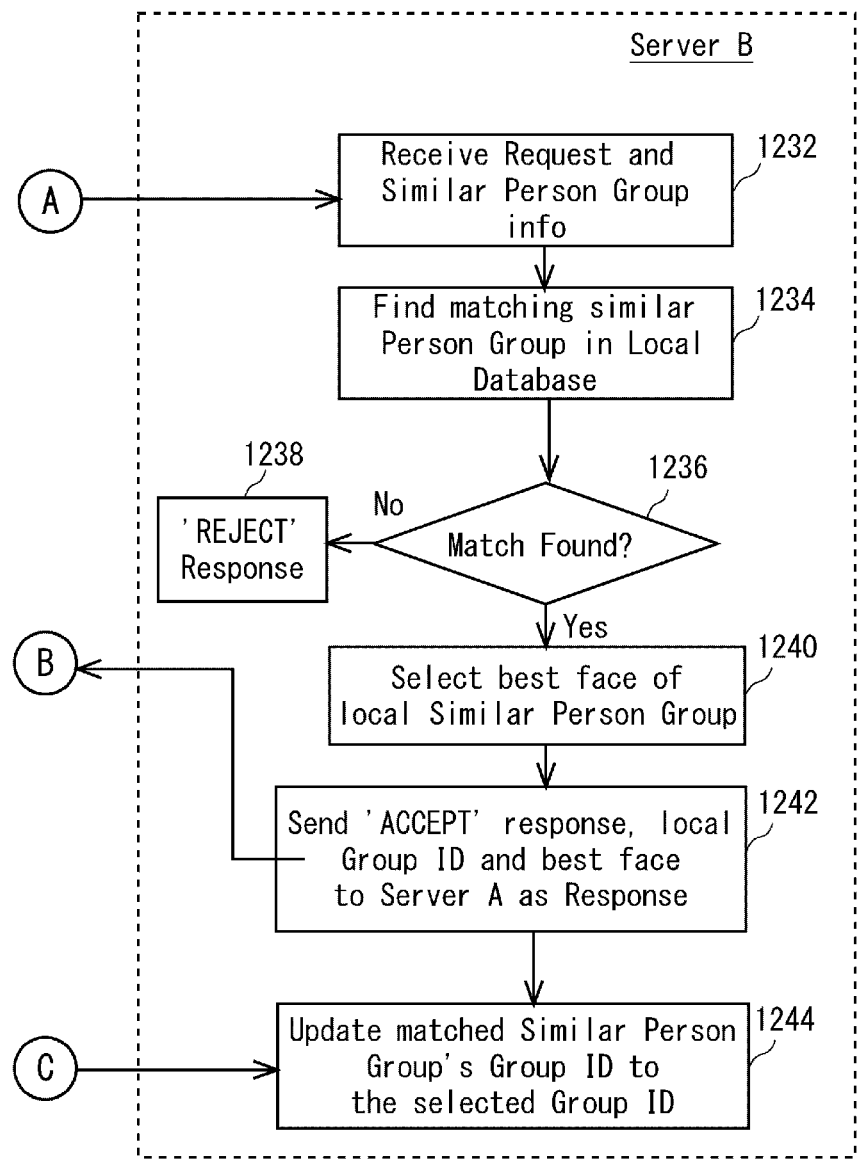
FIG. 12B depicts a flow chart illustrating a process of adaptively updating a target subject identification stored in a database of a server according an embodiment of the present disclosure.
Figure 13A:
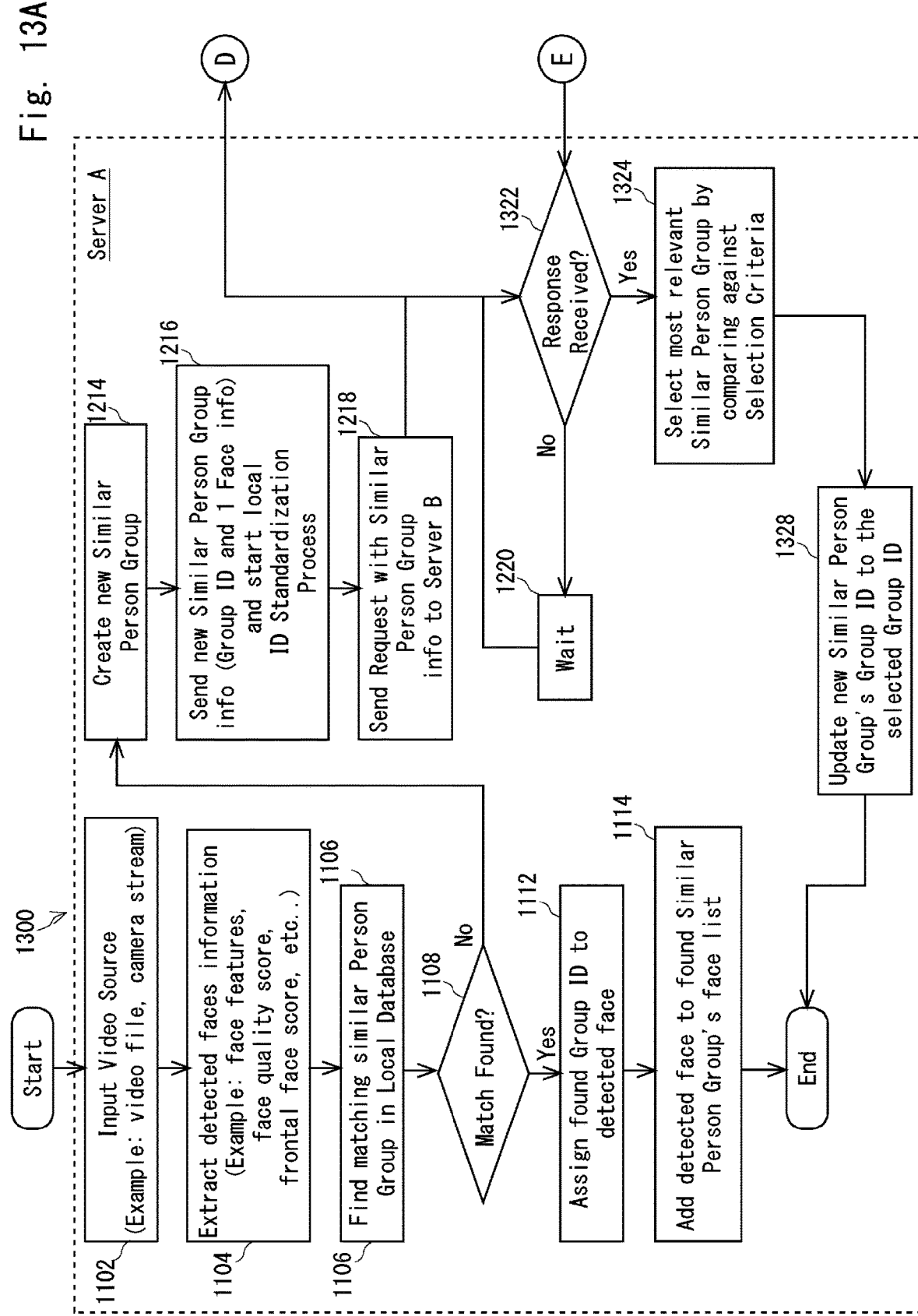
FIG. 13A depicts a flow chart illustrating a process of adaptively updating a target subject identification stored in a database of a server according another embodiment of the present disclosure.
Figure 13B:
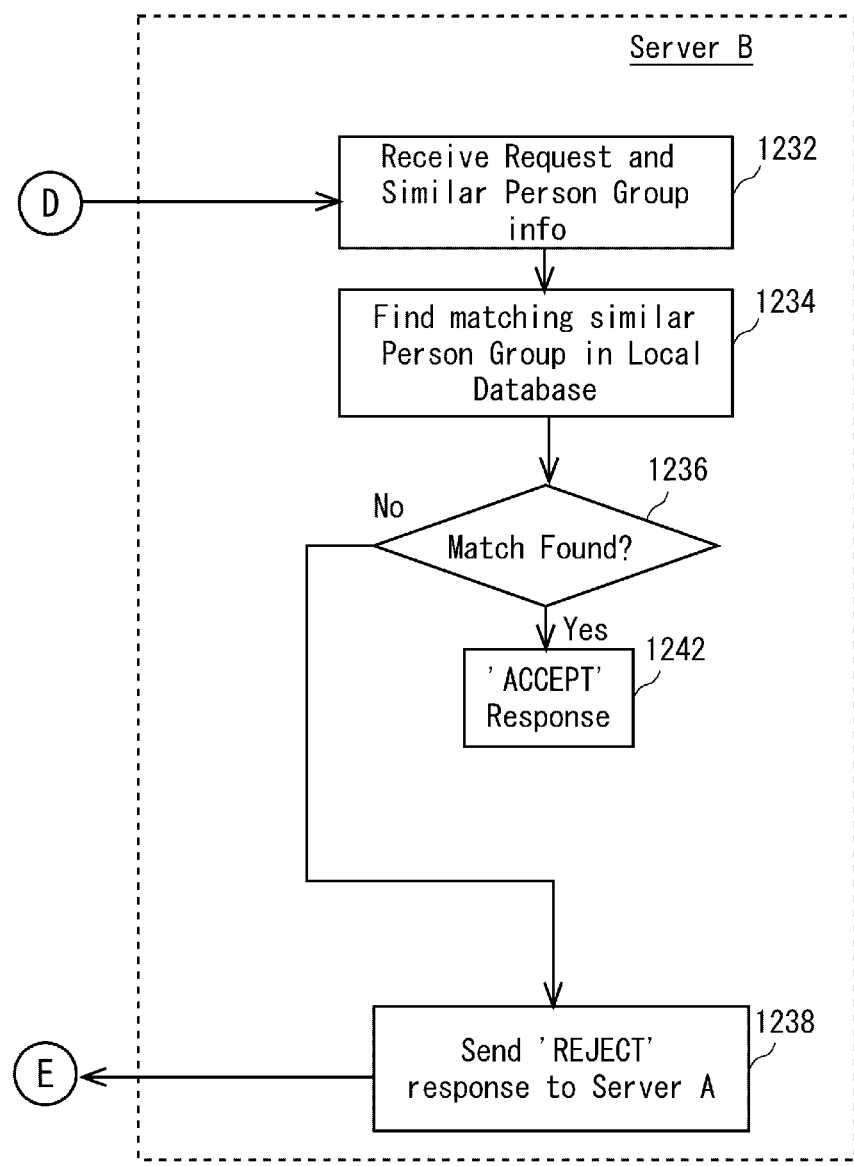
FIG. 13B depicts a flow chart illustrating a process of adaptively updating a target subject identification stored in a database of a server according another embodiment of the present disclosure.

FIGS. 12 and 13 are a continuation of FIG. 11 and depicts two flow charts 1200, 1300 illustrating a process of adaptively updating a target subject identification stored in a database of a server according an embodiment of the present disclosure. Referring to the flow chart 1200 in FIGS. 12, after step 1108 is carried out and it is determined that no match is found, an ID standardization process is initiated by Server A in step 1214 by creating a new Similar Person Group and a new Group ID (target subject ID) and assigning it to the new facial information extracted in step 1104, and in step 1216 by sending the new Similar Person Group information comprising the new facial information and the Group ID to an ID standardization module in Server A. In step 1218, a step of sending a request with the Similar Person Group information comprising the new facial information and the new Group ID to other servers such as Server B to synchronize the new Group ID. For the sake of simplicity, only the processing of one connected server, i.e., Server B, is illustrated. In step 1222, it is determined if a response has been received from Server B. If no response has been received, step 1220 is carried out to wait for its response.

Referring to Server B, in step 1232, the request with the Similar Person Group information comprising the new facial information and the new Group ID is received from Server A. Upon receiving the request, Server B may then determine whether or not to accept such request to synchronize the new Group ID and send a result of the determination (accept or reject the request) back to the server. In particular, in step 1234, the new facial information is then compared against a list of facial information stored in a local database 1107 of Server B to find a matching subject group specifically Similar Person Group (associated with Group ID) in this example. In step 1236, a list of facial information stored in the local database of Server B is retrieved and is determined if there is a match of Similar Person Group in Server B. The steps 1234, 1236 carried out in Server B are similar to steps 1106, 1108 carried out in Server A but the new facial information is compared against the local database of Server B and a matching score is calculated based on a comprising with the sets of facial information associated with the Similar Person Groups of Server B. If no match is found, for example, none of the sets of facial information in the local database of Server B has a matching score higher than the pre-defined minimum matching score, step 1238 is carried where a response to reject the request received from Server A is generated. More information will be discussed in FIG. 13.

If a match of a Similar Person Group (with a Group ID) is found in Server B, for example, a set of facial information of the Similar Person Group has a matching score higher than the pre-defined minimum matching score, step 1240 is carried out. In one embodiment, the step of determining if a match is found includes determining if reference information of the sets of facial information associated with the Similar Person Group and historical information, as described above and in steps 908, 910 in FIG. 9, meets a set of criteria. In step 1240, a most relevant set of facial information (most similar face, e.g., with the highest face frontal score) within the sets of facial information associated with the Group ID is selected. In step 1241, a response with the most similar face is sent back to Server A to accept the request sent by Server A and to participate in the synchronization of the Group ID. Returning to processing of Server A, in step 1222, when it is determined that a response from Server B (and other connecting servers) has been received, Step 1224 is carried out.

In step 1224, upon receiving sets of facial information and Similar Person Groups received in the responses of Server B and other participating servers accepting the request, selection criteria are used for comparing them, and to select the most favourable set of facial information and the most relevant Similar Person Group among them. The selection process and criteria are described above and illustrated in FIGS. 10A-C. In step 1226, the selected Group ID of the selected Similar Person Group is then broadcasted to Server B and all participating servers. In step 1228, the Similar Person Group's Group ID of Server A is updated to the selected Group ID. The new facial information associated with the updated Group ID is then stored in the local database of Server A. Similarly, in step 1244, the matched Similar Person Group IDs in Server B and other participating servers (not shown) are updated to the selected Group ID. The associated facial information with the updated Group ID is then stored in respective local databases of Server B and other participating servers. The ID standardization process may end.

FIG. 13 provide further details on the processing steps 1236 and 1238, specifically when it is determined that no match is found and a response to reject the request received from Server A to synchronize the Group ID is sent back to Server A. This indicates that Server B identifies there is no similar information stored in its local database relating to the new facial information and identifying the target subject, and no ID synchronization is required.

Returning to the processing of Server A, subsequent to step 1238, in step 1322, when it is determined that a response from Server B (and other connecting servers) has been received, Step 1324 is carried out. In step 1324, upon receiving sets of facial information and Similar Person Groups received in the responses of all participating servers accepting the request, selection criteria are used for comparing them, and to select the most favourable set of facial information and the most relevant Similar Person Group among them.

In step 1328, the Similar Person Group's Group ID of Server A is updated to the selected Group ID. The new facial information associated with the updated Group ID is then stored in the local database of Server A. As Server B did not send a response to accept the request to synchronize the Group ID, no result of the target subject ID is sent Server B.

Figure 14:
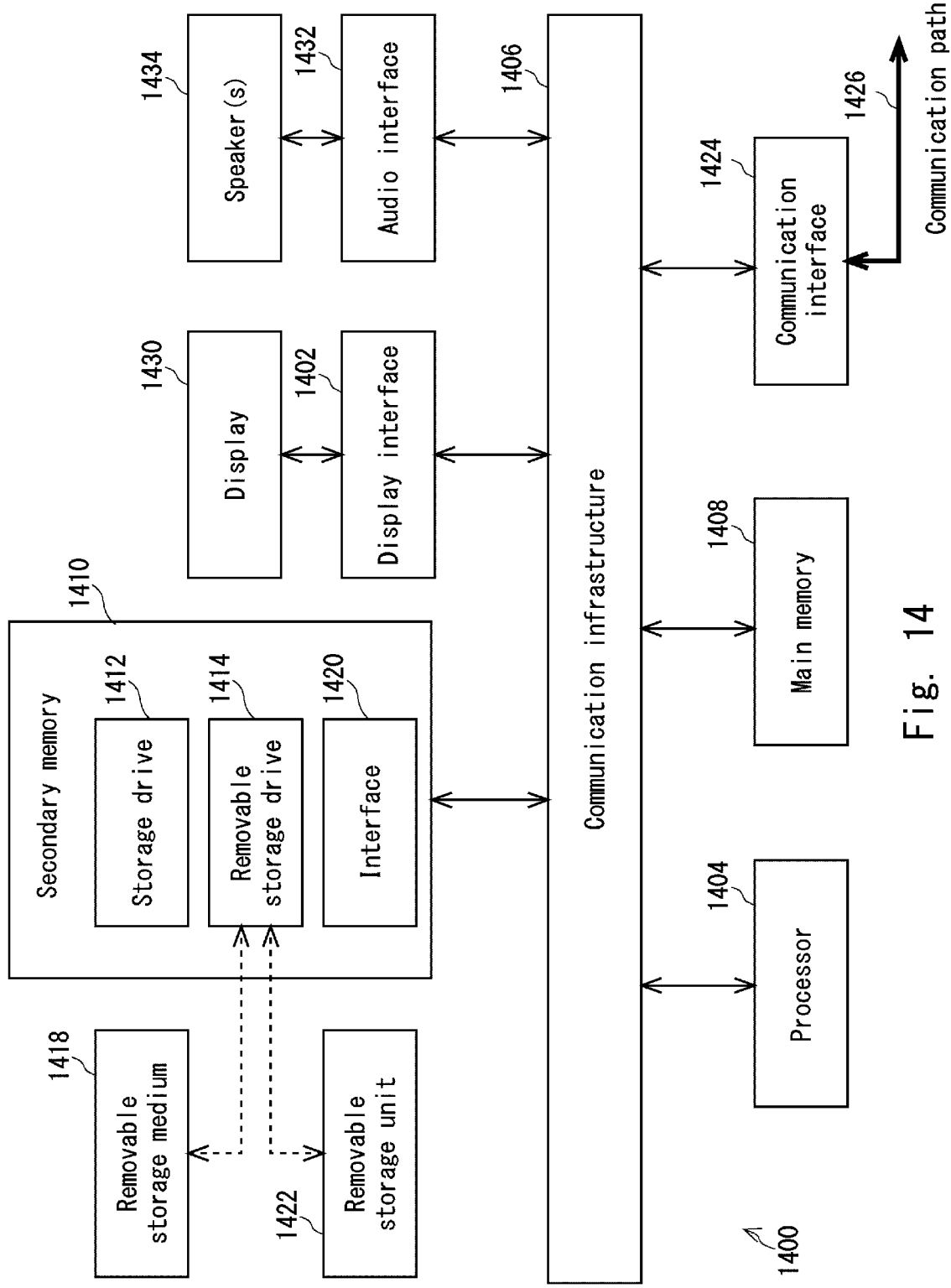
FIG. 14 depicts a schematic diagram of a computer system suitable for use as a system shown in FIG. 7 to implement methods shown in FIGS. 6A and 6B.

FIG. 14 depicts an exemplary computing device 1400, hereinafter interchangeably referred to as a computer system 1400, where one or more such computing devices 1400 may be used to execute the methods shown in FIGS. 6A and 6B. The exemplary computing device 1400 can be used to implement the system 700 shown in FIG. 7. The following description of the computing device 1400 is provided by way of example only and is not intended to be limiting.

As shown in FIG. 14, the example computing device 1400 includes a processor 1404 for executing software routines. Although a single processor is shown for the sake of clarity, the computing device 1400 may also include a multi-processor system. The processor 1404 is connected to a communication infrastructure 7406 for communication with other components of the computing device 1400. The communication infrastructure 1406 may include, for example, a communications bus, cross-bar, or network.

The computing device 1400 further includes a main memory 1408, such as a random access memory (RAM), and a secondary memory 1410. The secondary memory 1410 may include, for example, a storage drive 1412, which may be a hard disk drive, a solid state drive or a hybrid drive and/or a removable storage drive 1414, which may include a magnetic tape drive, an optical disk drive, a solid state storage drive (such as a USB flash drive, a flash memory device, a solid state drive or a memory card), or the like. The removable storage drive 1414 reads from and/or writes to a removable storage medium 1418 in a well-known order. The removable storage medium 1418 may include magnetic tape, optical disk, non-volatile memory storage medium, or the like, which is read by and written to by removable storage drive 1414. As will be appreciated by persons skilled in the relevant art(s), the removable storage medium 1418 includes a computer readable storage medium having stored therein computer executable program code instructions and/or data.

In an alternative implementation, the secondary memory 1410 may additionally or alternatively include other similar means for allowing computer programs or other instructions to be loaded into the computing device 1400. Such means can include, for example, a removable storage unit 1422 and an interface 1420. Examples of a removable storage unit 1422 and interface 1420 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 1422 and interfaces 1420 which allow software and data to be transferred from the removable storage unit 1422 to the computer system 1400.

The computing device 1400 also includes at least one communication interface 1424. The communication interface 1424 allows software and data to be transferred between computing device 1400 and external devices via a communication path 1424. In various embodiments of the inventions, the communication interface 1424 permits data to be transferred between the computing device 1400 and a data communication network, such as a public data or private data communication network. The communication interface 1424 may be used to exchange data between different computing devices 1400 which such computing devices 1400 form part an interconnected computer network. Examples of a communication interface 1424 can include a modem, a network interface (such as an Ethernet card), a communication port (such as a serial, parallel, printer, GPIB, IEEE 1394, RJ45, USB), an antenna with associated circuitry and the like. The communication interface 1424 may be wired or may be wireless. Software and data transferred via the communication interface 1424 are in the form of signals which can be electronic, electromagnetic, optical or other signals capable of being received by communication interface 1424. These signals are provided to the communication interface via the communication path 1424.

As shown in FIG. 14, the computing device 1400 further includes a display interface 1402 which performs operations for rendering images to an associated display 1430 and an audio interface 1432 for performing operations for playing audio content via associated speaker(s) 1434.

As used herein, the term "computer program product" may refer, in part, to removable storage medium 1418, removable storage unit 1422, a hard disk installed in storage drive 1412, or a carrier wave carrying software over communication path 1426 (wireless link or cable) to communication interface 1424. Computer readable storage media refers to any non-transitory, non-volatile tangible storage medium that provides recorded instructions and/or data to the computing device 1400 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 1400. Examples of transitory or non-tangible computer readable transmission media that may also participate in the provision of software, application programs, instructions and/or data to the computing device 1400 include radio or infra-red transmission channels as well as a network connection to another computer or networked device, and the Internet or Intranets including e-mail transmissions and information recorded on Websites and the like.

The computer programs (also called computer program code) are stored in main memory 1408 and/or secondary memory 1410. Computer programs can also be received via the communication interface 1424. Such computer programs, when executed, enable the computing device 1400 to perform one or more features of embodiments discussed herein. In various embodiments, the computer programs, when executed, enable the processor 1404 to perform features of the above-described embodiments. Accordingly, such computer programs represent controllers of the computer system 1400.

Software may be stored in a computer program product and loaded into the computing device 1400 using the removable storage drive 1414, the storage drive 1412, or the interface 1420. The computer program product may be a non-transitory computer readable medium. Alternatively, the computer program product may be downloaded to the computer system 1400 over the communications path 1426. The software, when executed by the processor 1404, causes the computing device 1400 to perform the necessary operations to execute the method as shown in FIGS. 6A and 6B.

It is to be understood that the embodiment of FIG. 14 is presented merely by way of example to explain the operation and structure of the system 400. Therefore, in some embodiments one or more features of the computing device 1400 may be omitted. Also, in some embodiments, one or more features of the computing device 1400 may be combined together. Additionally, in some embodiments, one or more features of the computing device 1400 may be split into one or more component parts.

It will be appreciated that the elements illustrated in FIG. 14 function to provide means for performing the various functions and operations of the servers as described in the above embodiments.

When the computing device 1400 is configured to optimize efficiency of a transport provider, the computing system 1400 will have a non-transitory computer readable medium having stored thereon an application which when executed causes the computing system 1400 To perform steps comprising: receive a first departure time of a vehicle which is administered by the transport provider at a first location; receive a second departure time of the vehicle at a second location which is located after the first location; determine a difference between the first departure time and the second departure time; and update a current schedule to provide an updated schedule in response to the determination of the difference, the updated schedule indicating an updated estimated arrival time of the vehicle at a location after the second location.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

This application is based upon and claims the benefit of priority from Singapore patent application No. 10202103210R, filed on Mar. 29, 2021, the disclosure of which is incorporated herein in its entirety by reference.

The invention claimed is:

1. A server apparatus for adaptively updating a target subject identification stored in a database, the target subject identification pertaining to a target subject in a system comprising another server apparatus configured to send a request to synchronize the target subject information, the server apparatus comprising:
at least one memory that stores instructions; and
at least one processor that is configured to execute the instructions to:
receive the request comprising target subject information relating to the target subject, from the other server apparatus;
detect, based on the target subject information, a subject group corresponding to the target subject from the database in which one or more subject groups are stored, the subject group being a group of data related to a corresponding subject;
acquire reference information corresponding to the detected subject group, the reference information corresponding to the subject group indicating a count of detections of the subject corresponding to the detected subject group and a last detection time of the subject corresponding to the subject group;
perform a first determination of whether the count of detections indicated by the acquired reference information is larger than a predefined count;
perform a second determination of whether the last detection time indicated by the acquired reference information is later than a predefined time;
determine whether or not to accept the request to synchronize the target subject identification based on a result of the first determination and a result of the second determination; and
send a response to accept the request to the other server apparatus based on a result of the determination of whether or not to accept the request.

2. The server apparatus according to claim 1, wherein the response comprises the target subject identification and the information stored in the database.

3. The server apparatus according to claim 1, wherein the at least one processor is further configured to:
determine a degree of similarity between the target subject information and the information stored in the database, wherein the determination of whether or not to accept the request is based on the degree of similarity.

4. The server apparatus according to claim 2, wherein the at least one processor is further configured to:
subsequent to sending the response to accept the request, update the target subject identification in the database.

5. A method, performed by a server apparatus, of adaptively updating target subject identification stored in a database, the target subject identification pertaining to a target subject in a system comprising another server apparatus configured to send a request to synchronize the target subject information, the method comprising:
- receiving the request comprising target subject information relating to the target subject, from the other server apparatus;
- detecting, based on the target subject information, a subject group corresponding to the target subject from the database in which one or more subject groups are stored, the subject group being a group of data related to a corresponding subject;
- acquiring reference information corresponding to the detected subject group, the reference information corresponding to the subject group indicating a count of detections of the subject corresponding to the detected subject group and a last detection time of the subject corresponding to the subject group;
- performing a first determination of whether the count of detections indicated by the acquired reference information is larger than a predefined count;
- performing a second determination of whether the last detection time indicated by the acquired reference information is later than a predefined time;
- determining whether or not to accept the request to synchronize the target subject identification based on a result of the first determination and a result of the second determination; and
- sending a response to accept the request to the other server apparatus based on a result of the determination of whether or not to accept the request.

6. The method according to claim 5,
wherein the response comprises the target subject identification and the information stored in the database.

7. The method according to claim 5, further comprising determining a degree of similarity between the target subject information and the information stored in the database, wherein the determination of whether or not to accept the request is based on the degree of similarity.

8. The method according to claim 5, wherein the method further comprising, subsequent to sending the response to accept the request, updating the target subject identification in the database.

* * * * *